US007587051B2

(12) United States Patent
Bisson et al.

(10) Patent No.: US 7,587,051 B2
(45) Date of Patent: Sep. 8, 2009

(54) SYSTEM AND METHOD FOR SECURING INFORMATION, INCLUDING A SYSTEM AND METHOD FOR SETTING UP A CORRESPONDENT PAIRING

(76) Inventors: Denis Bisson, 2335, 28th Avenue, Drummondville, Quebec (CA) J2B 8J4; Patrick Larouche, 1100 Marchant, # 25, Drummondville, Quebec (CA) J2C 7S5; Martin Roy, 4876 Fugère Street, Drummondville, Quebec (CA) J2E 1V1; Marie-Claude Gagnon, 4876 Fugère Street, Drummondville, Quebec (CA) J2E 1V1; Gérald Duhamel, 290 St-Damase Street, Drummondville, Quebec (CA) J2B 6J5

( * ) Notice: Subject to any disclaimer, the term of this patent is extended or adjusted under 35 U.S.C. 154(b) by 855 days.

(21) Appl. No.: 10/755,668

(22) Filed: Jan. 13, 2004

(65) Prior Publication Data
US 2004/0165729 A1    Aug. 26, 2004

Related U.S. Application Data

(60) Provisional application No. 60/439,493, filed on Jan. 13, 2003.

(51) Int. Cl.
*H04L 9/00* (2006.01)
(52) U.S. Cl. ...................................... 380/281; 713/168
(58) Field of Classification Search .................. 713/165, 713/167, 168, 169, 171, 194; 380/278, 281, 380/282, 286
See application file for complete search history.

(56) References Cited
U.S. PATENT DOCUMENTS 5,293,424 A    3/1994    Hotley 5,307,411 A    4/1994    Anvret
5,552,897 A    9/1996    Mandelbaum
5,748,735 A    5/1998    Ganesan (Continued)

FOREIGN PATENT DOCUMENTS

EP    0869652 A2    10/1998

(Continued)

OTHER PUBLICATIONS

Matt Blaze, High-Bandwidth Encryption with Low-Bandwidth Smartcards, Dec. 3, 1995.

*Primary Examiner*—Beemnet W Dada
(74) *Attorney, Agent, or Firm*—Benoît & Côté, s.e.n.c.

(57) ABSTRACT

The present invention consists in a system for securing data exchanged between two users having a First Information Processing System (FIPS) and a Second Information Processing System (SIPS) that have been correspondently paired. To complete encryption, the system includes a FIPS to encrypt data with a key, a SIPS to encrypt said key with a stored correspondent key and to encrypt correspondent key identifier with a public key common to the SIPSs. The integrated secured data include FIPS and SIPS encrypted information. The invention is also suitable for decryption. The invention further comprises structures to perform correspondent pairing between two SIPSs in order to exchange secured information. Furthermore, it comprises a pairing method wherein the SIPSs identify each other, exchange ciphered availability codes on the basis of available keys and key identifiers, and also set a correspondence pairing when a key and key identifier available in both SIPSs are identified.

10 Claims, 25 Drawing Sheets

U.S. PATENT DOCUMENTS

| | | |
|---|---|---|
| 5,751,813 A | 5/1998 | Dorenbos |
| 6,085,323 A * | 7/2000 | Shimizu et al. ............. 713/150 |
| 6,347,145 B2 | 2/2002 | Kato |
| 6,377,688 B1 | 4/2002 | Numao |
| 6,775,382 B1 * | 8/2004 | Al-Salqan ................... 380/286 |
| 7,362,862 B2 * | 4/2008 | Schneier et al. ............. 380/251 |
| 2001/0041593 A1 | 11/2001 | Asada |
| 2003/0056099 A1 | 3/2003 | Asanoma |

FOREIGN PATENT DOCUMENTS

| | | |
|---|---|---|
| EP | 1217783 A1 | 6/2002 |
| WO | WO 00/59155 | 10/2000 |

\* cited by examiner

SYSTEM AND METHOD FOR SECURING INFORMATION, INCLUDING A SYSTEM AND METHOD FOR SETTING UP A CORRESPONDENT PAIRING

RELATED PATENT APPLICATION

The present application claims the benefit of U.S. Provisional Patent Application No. 60/439,493, filed Jan. 13, 2003 and entitled "ENCRYPTION/DECRYPTION CARD". The whole content of this provisional application is hereby incorporated by reference.

FIELD OF THE INVENTION

The invention relates to a method and a system for securing sensitive information. It further relates to the messaging of such sensitive information between two users in an electronic format. It also relates to a method and a system suitable for a correspondent pairing for sensitive information communication.

BACKGROUND OF THE INVENTION

Securing the information to exchange is an important aspect of communication nowadays; sensitive data must be kept secret from unauthorized persons. Accordingly, many techniques and systems have been developed with this objective in mind. Some techniques relate to securing communication means while others relate to securing the data communicated. The prior art that is the most worthy of mention in accordance with the present invention consists of the two following documents.

The first prior art, "PUBLIC KEY INFRASTRUCTURE (PKI) BASED SYSTEM, METHOD, DEVICE AND PROGRAM", developed by Asanoma et al., is available as U.S. publication No. 2003/0056099. This U.S. patent publication discloses a system for the distribution of smart cards (a.k.a. IC cards) that includes an authentication certificate and encryption/decryption capabilities based on a public key and a secret key. The system described in the present document has the advantage, over the prior art, of saving time and labor involved in the collection and redistribution of smart cards done in order to update a private key and a public certificate.

The second relevant prior art worthy of mention is "INFORMATION PROCESSING SYSTEM HAVING FUNCTION OF SECURELY PROTECTING CONFIDENTIAL INFORMATION", developed by Shimizu et al., and available as U.S. Pat. No. 6,085,323. This U.S. patent discloses an encryption system wherein the encryption process is completed by two distinct devices. A first device, namely a computer, establishes a first encryption key and encrypts sensitive data with this first key. The first key is transmitted to a second encryption device, namely a smart card, which encrypts the first key with a second encryption key and transmits the encrypted first key to the first encryption device. The first encryption device is also composed of correlation storage means for correlatively storing the encrypted sensitive data and the encrypted first key.

Although the above prior art provides a certain level of security for sensitive data and efficient certificate management, further improvement is desirable in these fields of technology.

OBJECTS OF THE INVENTION

Accordingly, an object of the invention is to provide a higher security level for sensitive data; once secured, this sensitive data is either stored in a storage means with a lower security level or is transmitted through a communication means with a lower security level.

Another object is to ensure that secret information is always secure. In other words, the present object is to prevent the unwanted communication of secret information, regardless of the device receiving the secret information.

Yet another object is to communicate information with two sensitivity levels without increasing the required information processing.

Providing a method and a system for the authentication of users' systems to which the sensitive information has to be transferred while preventing the unwanted communication of any secret information is another object of the present invention.

Another object is to establish pairing between users' systems that exchange secured sensitive information.

SUMMARY OF THE INVENTION

The invention comprises a First Information Processing System (FIPS) and a Second Information Processing System (SIPS) operating together to encrypt, to decrypt, or to complete a correspondent pairing process with another FIPS and SIPS combination.

In this specification, the term "First Information Processing System (FIPS)" is intended to mean a system for which limited security level is available. For instance, this system may be a personal computer protected with firewalls and passwords, as illustrated on FIG. 1. Other examples of this type of systems are handheld computers, cell phones, wireless communication devices, and fax machines. These systems typically allow users to generate, to access, to store and/or to communicate sensitive data.

In this specification, the term "Second Information Processing System (SIPS"" is intended to mean a system for which limited security level is available. For instance, this system may be a personal computer protected with firewalls and passwords, as illustrated on FIG. 1. Other examples of this type of systems are handheld computers, cell phones, wireless communication devices, and fax machines. These systems typically allow users to generate, to access, to store and/or to communicate sensitive data. The SIPS 12 is a system providing a higher security level. A typical example of this kind of system is composed of highly-secured smart cards, or IC cards as illustrated on FIG. 1. This kind of system can prevent any unauthorized person from reading stored information. It may be, and ideally is, effective in preventing many kinds of attacks, such as Timing Attack, Power Analysis Attack, etc. The SECURE CRYPTOGRAHIC DEVICE described in European patent application no EP 1 217 783 by Myazaki et al. is a good example of an embodiment suitable for the realization of the SIPS in the present invention.

For an encryption process, the SIPS essential functionalities are communication means; storage means that store a public key, correspondent data, and a plurality of keys and key identifiers; and encryption means. The essential functionalities of the FIPS are communication means, correspondent selection means, key generation means, encryption means, and storage means.

The encryption process comprises the reception of a correspondent selection, the generation of a first key, the encryption of the sensitive data using the first key, the encryption of the first key using an identified correspondent key, the encryption of an identified correspondent key identifier using a public key, the integration of the encrypted sensitive data, the encrypted first key and encrypted key identifier together.

For the decryption process, the SIPS functionalities are communication means; storage means that store a public key, correspondent data, and a plurality of keys and key identifiers; and decryption means. The functionalities of the FIPS are storage means, extraction means, communication means, and decryption means.

The decryption process comprises the extraction of the information from the integrated sensitive data, the decryption of a key identifier using the public key, the decryption of the first key using the key associated key identifier, and the decryption of the sensitive data using the first key.

The pairing process consists in ensuring that two SIPSs have the same pairing data, therefore, a same key and key identifier combination for the correspondence between the two SIPSs.

BRIEF DESCRIPTION OF THE FIGURES

A thorough understanding of the invention should be available in light of the following description of the invention and of the accompanying figures, wherein.

DETAILED DESCRIPTION OF THE INVENTION

The main object of the invention is to allow users to share secured sensitive data. To reach this object, a series of processes are required and are hereinafter described in details. In the first of these processes, the first user secures such sensitive data. In the second process, the second user accesses and reads the secured sensitive data. The third process allows the setting up of relationships (correspondent pairings) between users' systems for the communication of these secured sensitive data.

1. General Description of Securing Components

The first object of the invention is to secure sensitive data. To attain that object, the invention illustrated on FIG. 1 comprises two components: a First Information Processing System (FIPS) 10 and a Second Information Processing System (SIPS) 12. The FIPS 12 is a system for which limited security level is available. For instance, this system may be a personal computer protected with firewalls and passwords, as illustrated on FIG. 1. Other examples of this type of systems are handheld computers, cell phones, wireless communication devices, and fax machines. These systems typically allow users to generate, to access, to store and/or to communicate sensitive data The SIPS 12 is a system providing a higher security level. A typical example of this kind of system is composed of highly-secured smart cards, or IC cards as illustrated on FIG. 1. This kind of system can prevent any unauthorized person from reading stored information. It may be, and ideally is, effective in preventing many kinds of attacks, such as Timing Attack, Power Analysis Attack, etc. The SECURE CRYPTOGRAHIC DEVICE described in European patent application no EP 1 217 783 by Myazaki et al. is a good example of an embodiment suitable for the realization of the SIPS in the present invention.

In order to secure sensitive data, the FIPS and the SIPS complete three general processes: the authentication of the system user, the selection of a correspondent, and the securing of sensitive data. According to these three general processes, the systems are hereinafter described further with a detailed depiction of these processes.

2. Authentication

The system-user authentication process ensures a rightful utilization of the systems. Accordingly, only the authorized persons may secure sensitive data with the present invention. Furthermore, depending on system configuration, authorized utilization may be limited to a single user or be available to a plurality of users who may or may not have the same freedom of use.

2.1. Authentication—Structural Description

Figure 2:
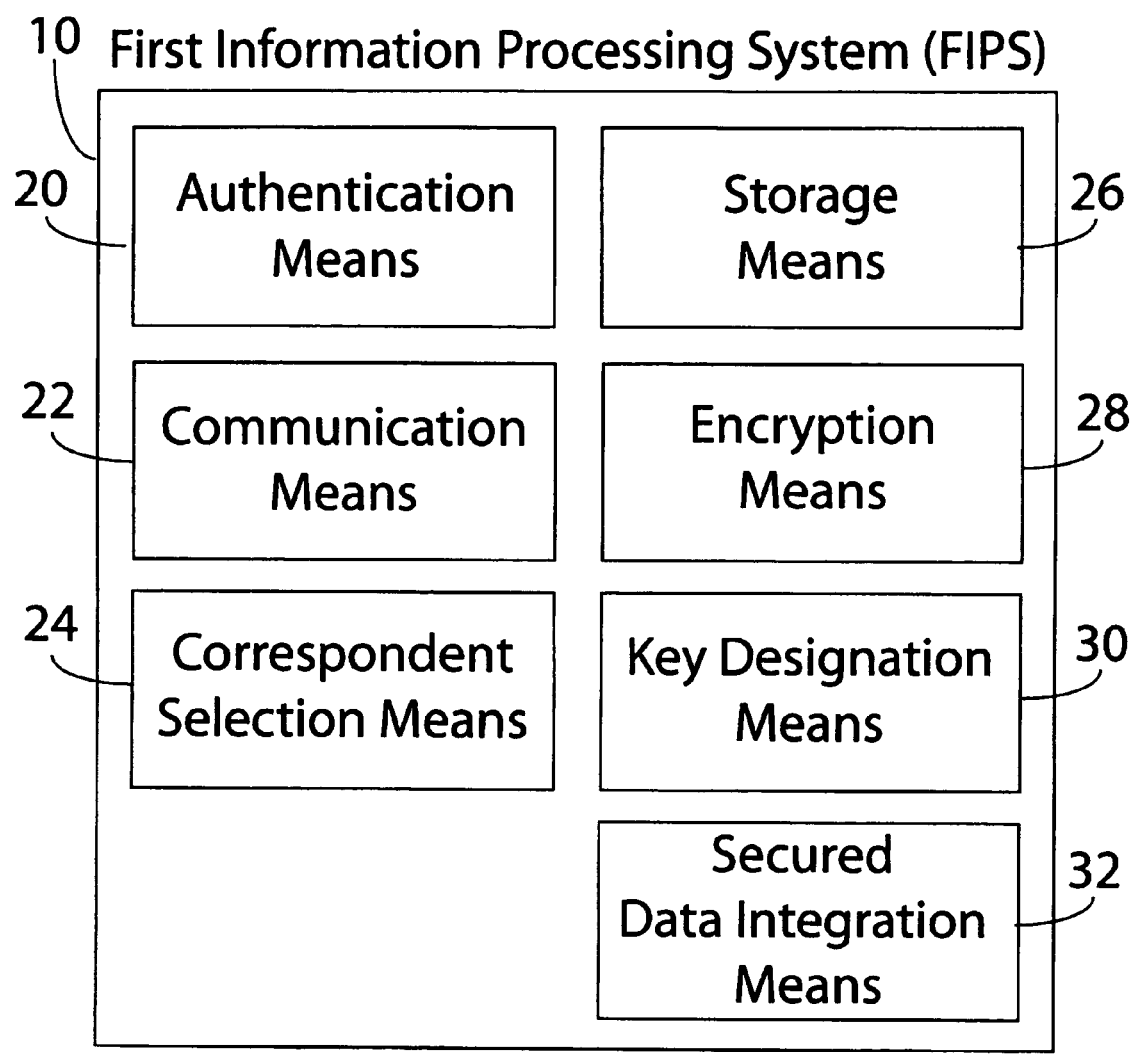
FIG. 2 is a schematic block diagram illustrating FIPS encryption components.
Figure 3:
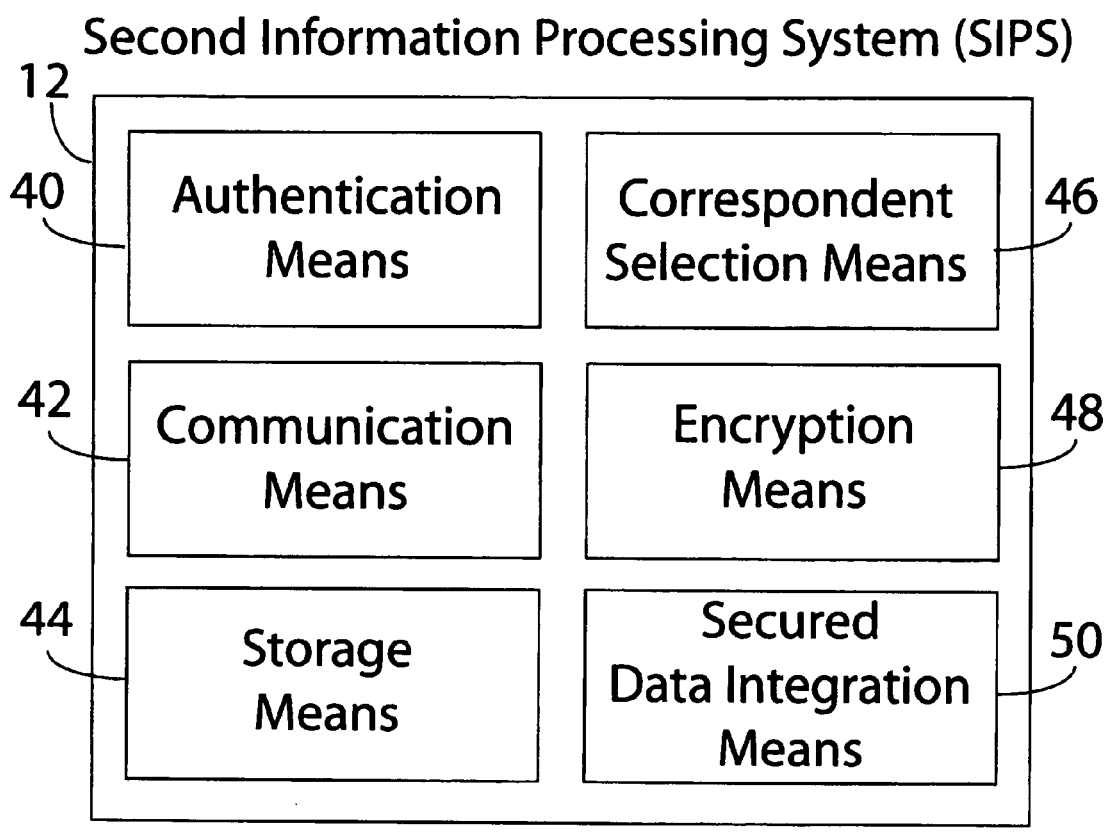
FIG. 3 is a schematic block diagram illustrating SIPS encryption components.

In order to complete that authentication process, the FIPS 10 illustrated on FIG. 2 comprises authentication means 20 and communication means 22. The SIPS illustrated on FIG. 3 also comprises authentication means 40, communication means 42, and storage means 44. The FIPS authentication means 20 allows a user to provide identification data. This data may be in an informative format (such a username and a password), a biometric format (such as a finger print, a voice print, etc.), or any other suitable format. The object of the communication means 22 and 42 is to provide a communication link between the systems 10 and 12. The SIPS authentication means 40 verifies provided authentication data; authorizes the SIPS use; and, when available, identifies a corresponding available use level. Such use level may be to determine correspondents among the stored correspondents, these correspondents being available to complete the following sensitive data securing process.

2.2. Authentication—Process Description

Figure 4:
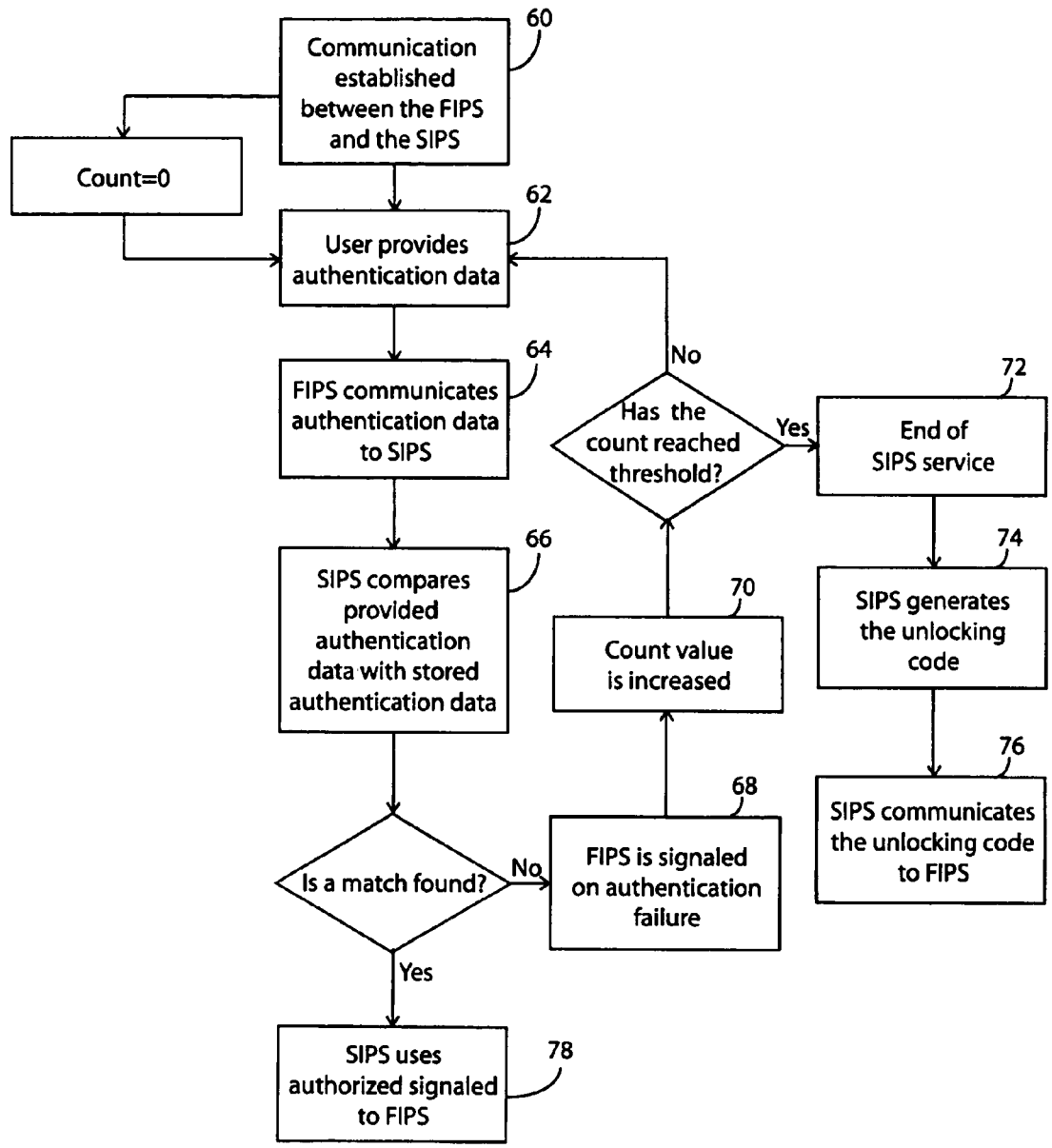
FIG. 4 is a flow chart illustrating the authentication process.
Figure 5:
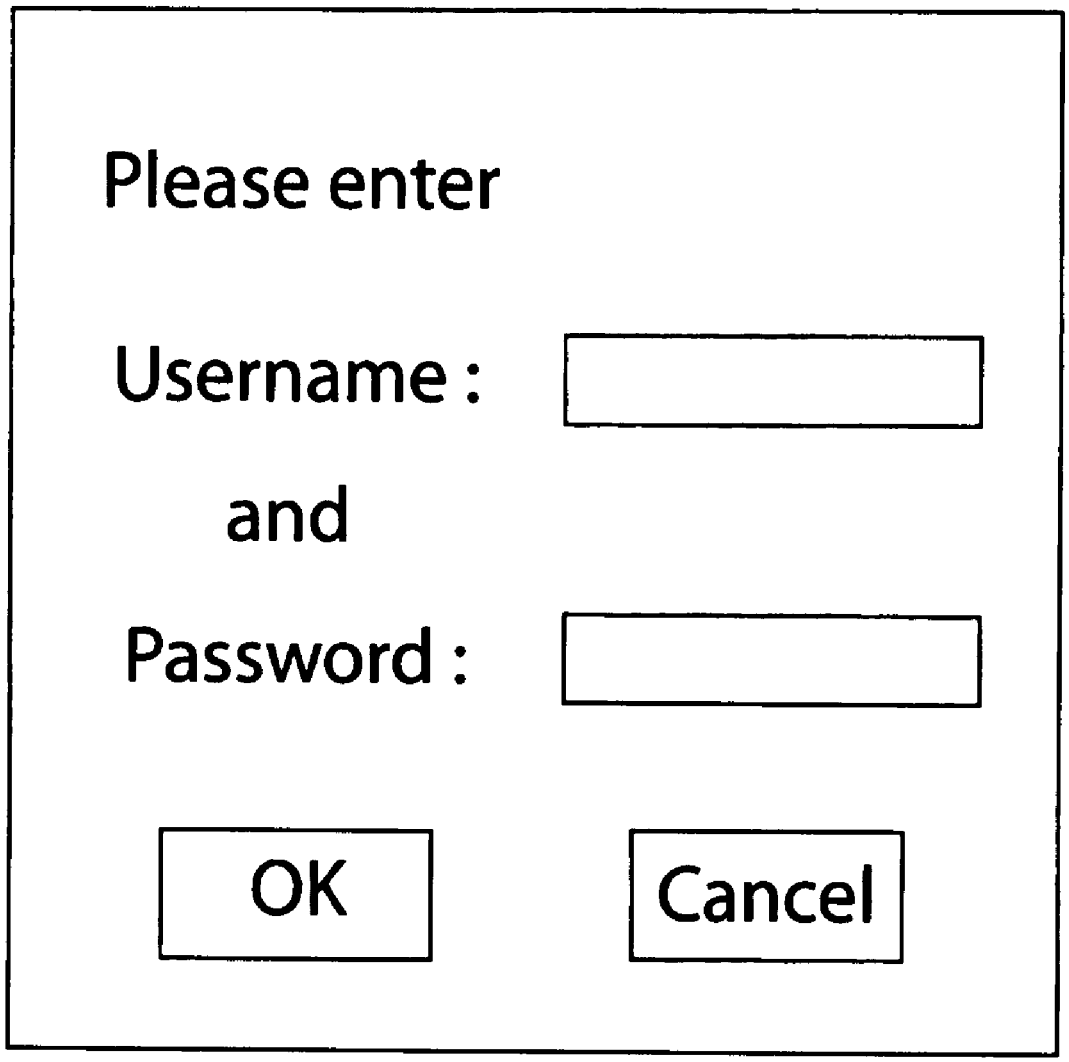
FIG. 5 is a schematic representation of an authentication window.

To complete the authentication process, illustrated on FIG. 4, the typical steps are as follows. The user establishes a communication between the systems (step 60). Typically, the user accomplishes this step by inserting the SIPS (smart card) into a card reader. In the following step, the FIPS display prompts the user to provide identification data. An example of the prompting screen is illustrated on FIG. 5. In the present example, the user enters a username and a password (step 62). These identification data are transmitted to the SIPS authentication means (step 64). The SIPS authentication means seeks matching information among the identity data in the SIPS storage means (step 66). If no matching data are found, the SIPS authentication means transmits an "Authorization Refusal" signal to the FIPS authentication means (step 68). The SIPS also updates a count of erroneous-identification data (step 70). The user is informed that he has entered erroneous-identification data and is invited to enter new ones (step 62). The process repeats itself up until a matching identification datum is found, or the erroneous identification data count reaches an unauthorized threshold. If this threshold is reached, the SIPS authentication means orders the FIPS authentication means to end the current user session (step 72). The SIPS authentication means generates an unlocking code (step 74), which is also transmitted to the FIPS authentication means (step 76). The latter informs the user to communicate with an unlocking authority to get a new access code. If a matching datum is found, the SIPS authentication means signals an "authorization" to the FIPS (step 78), which starts a correspondent selection process.

3. Correspondent Selection

The objective of securing sensitive data is to allow the safe exchange of this sensitive data between two users' systems: a sender's and a receiver's system. Depending on the needs, the sender and the receiver may be different persons or the same person at different times; moreover, the receiver may be a single person or a group of persons. However, the object is to prevent any person other than these users to access the sensitive data. Only the users have the privilege of allowing a party who is not a user to read the sensitive information. This privilege may be limited by means, which are not described in the present document.

3.1 Correspondent Selection—Structural Description

In order to complete that process, the FIPS 10—FIG. 2 further comprises correspondent selection means 24. The SIPS 12—FIG. 3 also comprises, for its part, correspondent selection means 46. The SIPS storage means 44 stores useful data necessary for the process.

In order to provide a thorough understanding of the process, an example of suitable data structure stored in the SIPS storage means is included. As illustrated on FIG. 6, the SIPS comprises correspondent identifications 88. Some correspondent data identify users are single persons 88a, while others are groups 88b. However, whatever the type of users 88, the data is processed in exactly the same way. The data table illustrates each correspondent 88 with his associated encryption key 90 and his unique encryption key identification 92.

3.2 Correspondent Selection—Process Description

Figure 7:
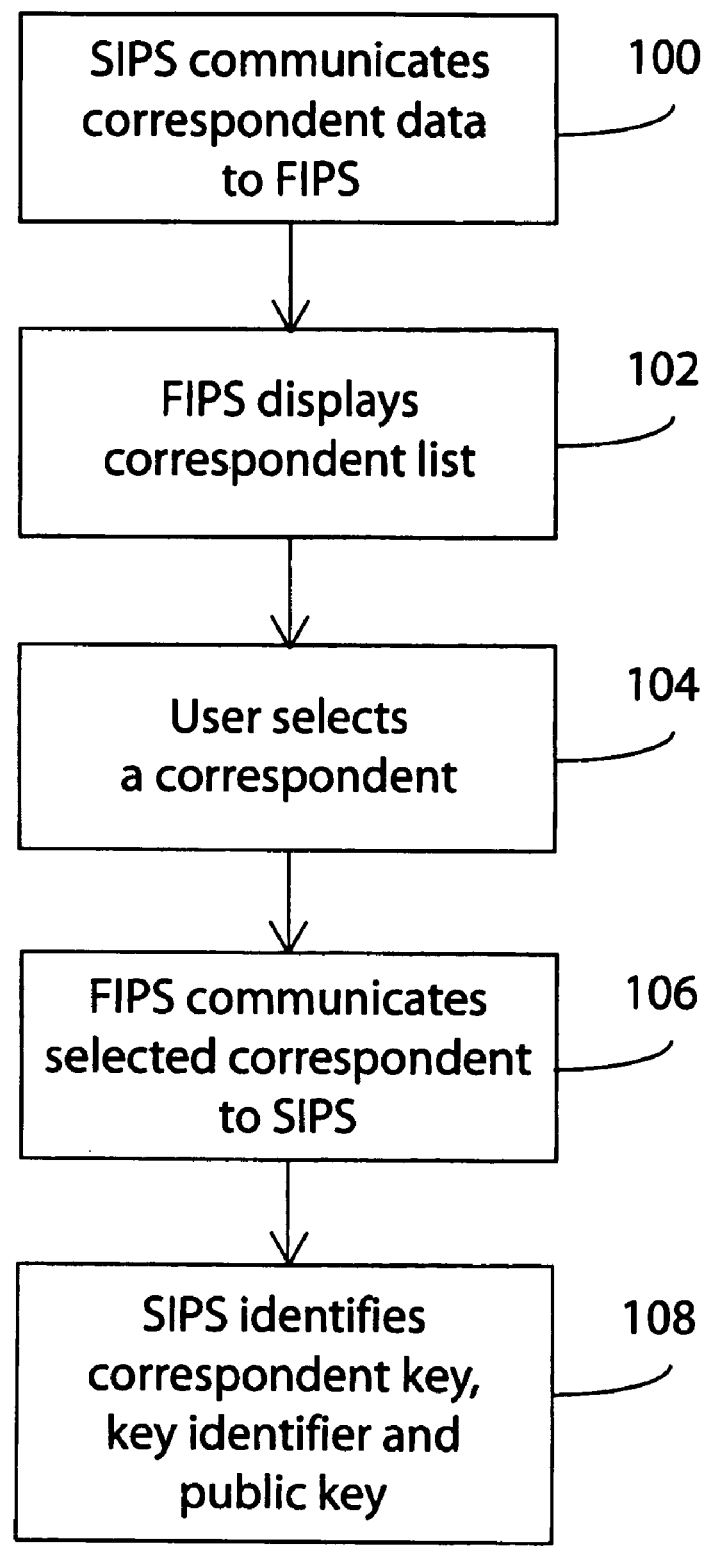
FIG. 7 is a flow chart illustrating the correspondent selection process.
Figure 8:
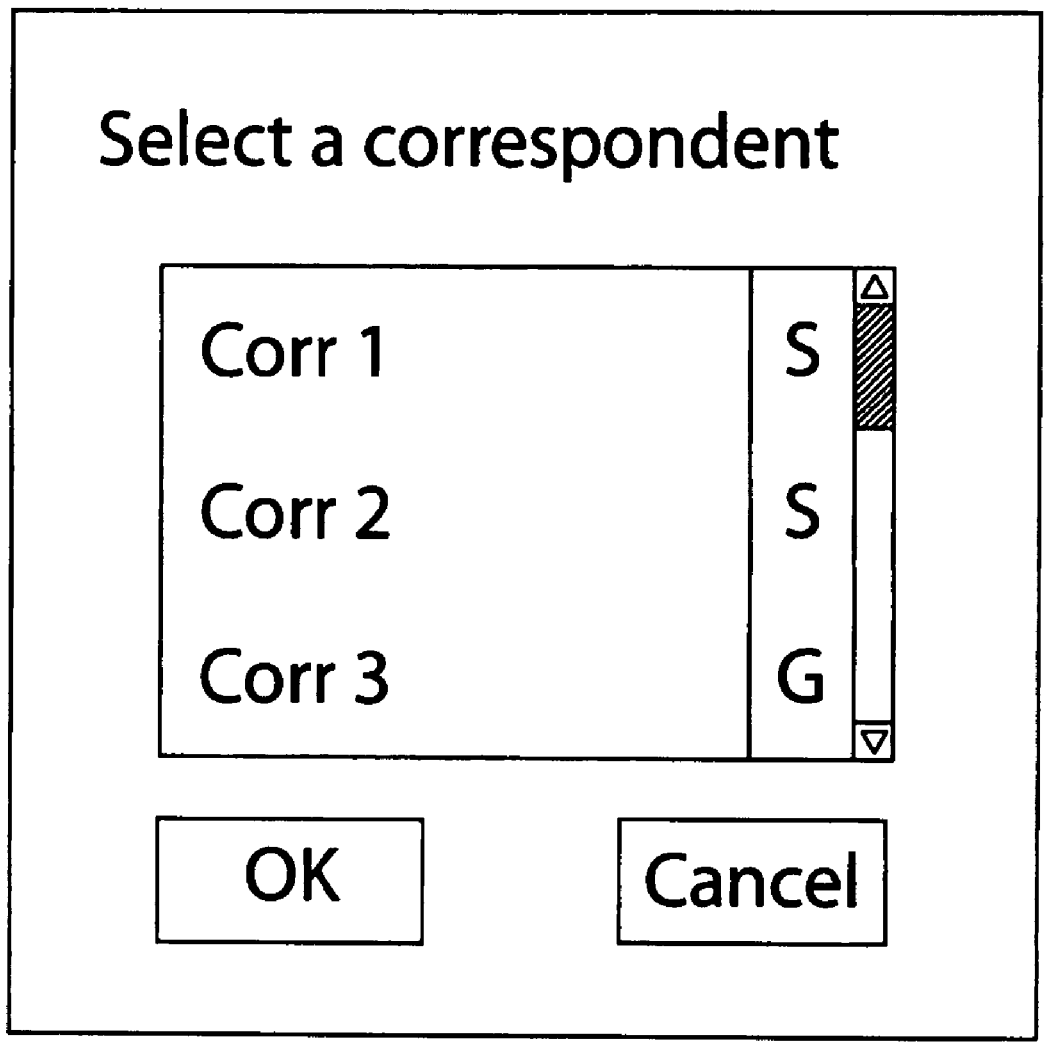
FIG. 8 is a schematic representation of a window suitable to select a correspondent.

As stated above, when the authentication process is successfully completed, the correspondent selection process, illustrated on FIG. 7, starts. As a result, the SIPS transmits the list of correspondents from its storage means to the FIPS correspondent selection means (step 100). The FIPS displays the list of correspondents (step 102). FIG. 8 illustrates a typical window that displays a plurality of potential correspondents (step 104). Typically, the user selects with a mouse click one listed correspondent, which becomes the correspondent selection. Then the correspondent selection window closes. The FIPS transmits the selection to the SIPS correspondent selection means (step 106). The correspondent selection means identifies a correspondent key B and key B identifier in the storage means (step 108). The correspondent selection means also identifies a public key S (also step 108). The securing process is then ready to begin.

4. Encryption

Once the authentication and the correspondent selection processes are completed, the next process is to secure the sensitive data. According to the invention, the sensitive data will be rightfully secured after this process, and only the designated user(s) (established through the correspondent selection) will be able to access the unsecured sensitive data. The sensitive-data securing process consists encrypting the data following the principle of the present invention. Furthermore, according to the invention, sensitive and non-sensitive data may be transmitted to the receiver's system, with only sensitive data being secured. A result of this process is to allow the insertion of an <<Information message>> presented in plain text informing the non-designated users that the secured data content is confidential and that any attempt to read the content without the sender's authorization constitutes a fraud.

4.1 Encryption—Structural Description

Accordingly, the FIPS 10 illustrated on FIG. 2 comprises storage means 26, encryption means 28, key designation means 30, and secured data integration means 32. The SIPS 12 illustrated on FIG. 3 further comprises encryption means 48 and secured data integration means 50. The FIPS key designation means 30, in a first realization, randomly establishes an encryption key. The FIPS encryption means 28 uses this randomly established key to encrypt the sensitive data into temporarily secured data. The SIPS encryption means 48 encrypts the FIPS originating key and key identifier as hereinafter described. The FIPS secured data integration means 50 generates, at the end, a secured sensitive data based on both the FIPS and SIPS information.

4.2 Encryption—Process Description

Figure 9:
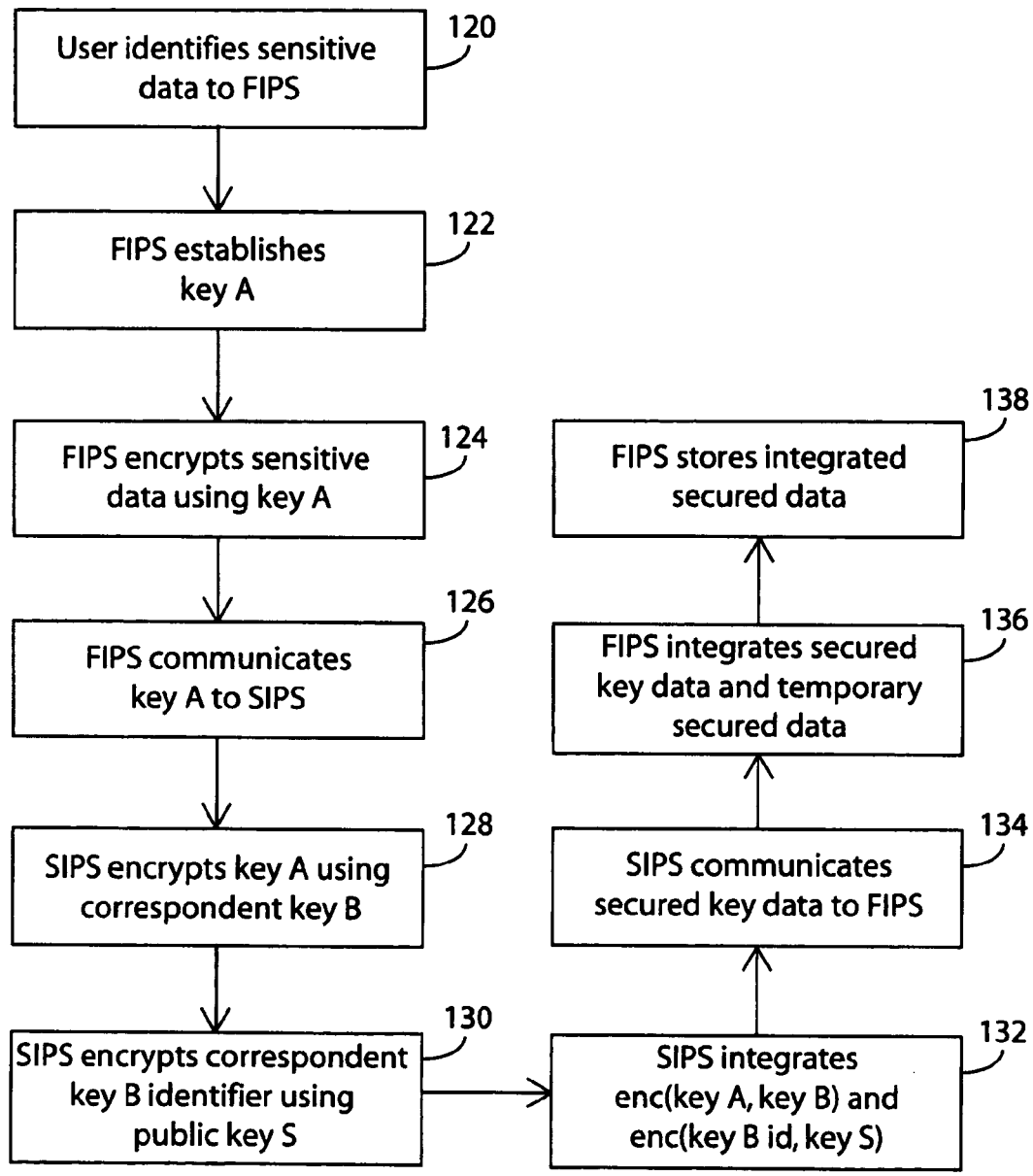
FIG. 9 is a flow chart illustrating the encryption process.
Figure 10:
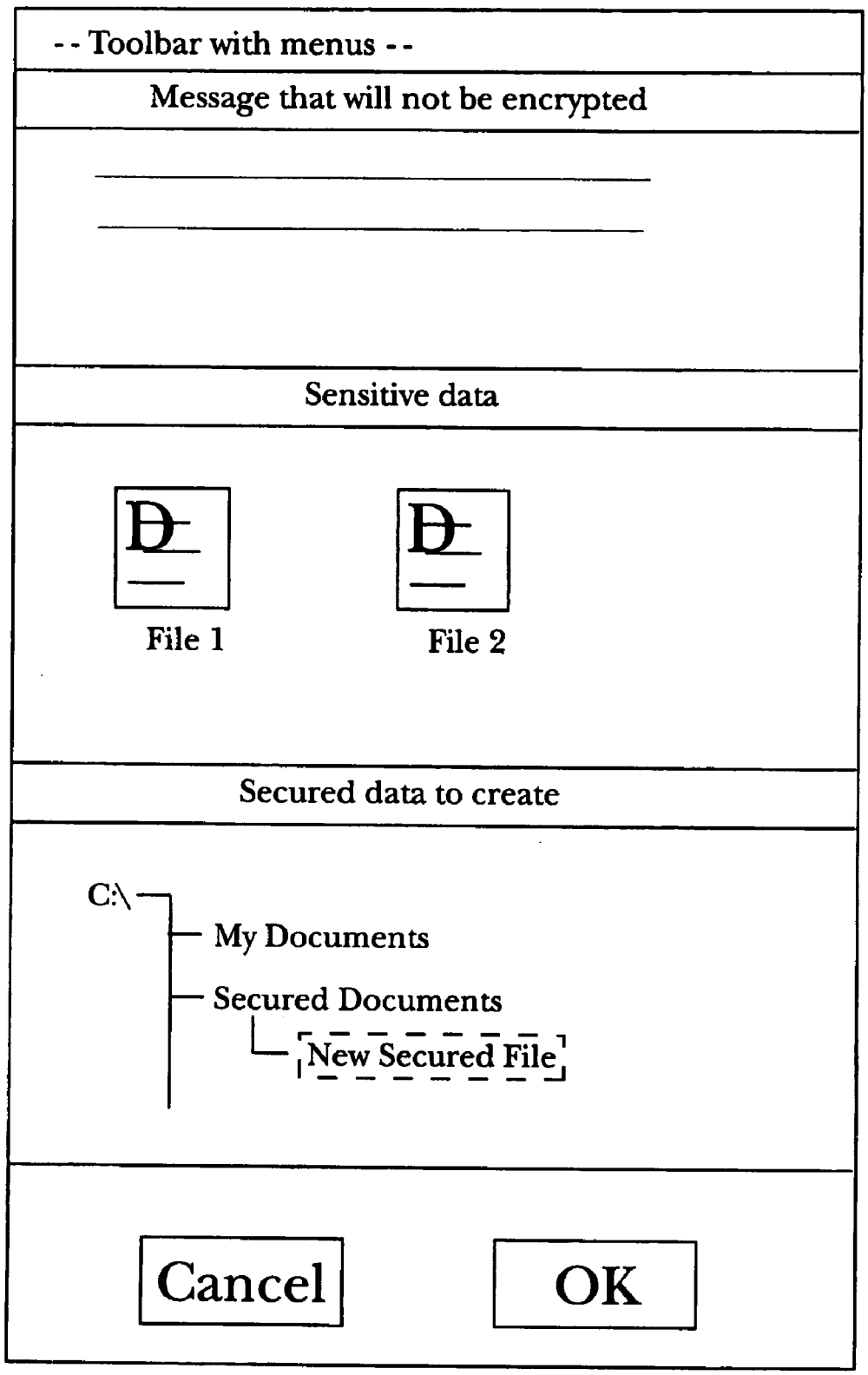
FIG. 10 is a schematic representation of a window displayed during the encryption process.

The steps to complete the encryption process illustrated on FIG. 9 are as follows. After the selection of a correspondent, the FIPS opens a securing software window. An example of such a window is illustrated on FIG. 10. Through this window, the user selects the sensitive data to be secured (step 120). Then, the FIPS temporarily stores the sensitive data in its storage means. The FIPS establishes a first encryption key A (step 122). This encryption key A changes every time a securing process is performed, and is ideally established regardless of the selected correspondent, or any other system state. On the basis of this key A, the FIPS encryption means encrypts the sensitive data into temporarily secured data and stores it in the FIPS storage means (step 124). The FIPS communicates the key A to the SIPS (step 126). The SIPS encryption means encrypts the key A using the key B (step 128) that corresponds to the selected correspondent identified key. The result is a secured key A. The SIPS encryption means also encrypts the identified key B identifier using the public key S (step 130). The result is a secured key B identifier. The SIPS secured data integration means integrates these secured data into a single secured key data (step 132). The secured key data is transmitted to the FIPS (step 134), which temporarily stores it in its storage means. At the end, the FIPS secured data integration means integrates the temporarily secured data, the secured key data, and any non-secured non-sensitive data that the user may want to include into an integrated secured data (step 136). This integrated secured data is stored on the FIPS storage means (step 138) and is ready to be communicated.

In a preferred realization, any trace of unsecured sensitive data, temporary secured data, and secured key data is erased from the FIPS storage means. Consequently, someone fraudulently gaining access to the FIPS would not be able to access the sensitive data.

Figure 11:
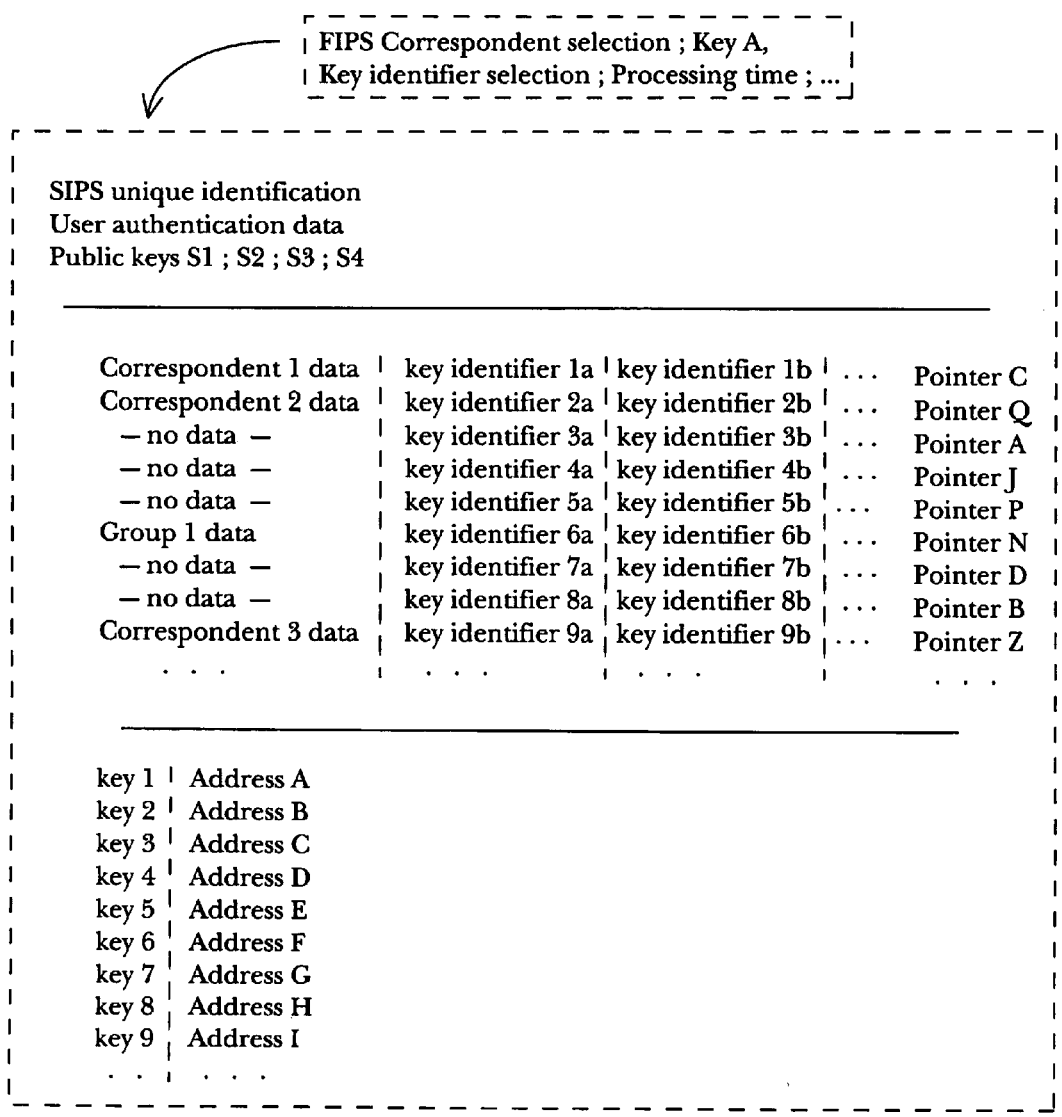
FIG. 11 is a schematic representation of alternative FIPS stored data.

Many additions to the above processes are available. The encryption algorithm used by the FIPS and the SIPS encryption means 28 and 48 can be identical or not. For instance, the FIPS encryption means 28 may use a 3-DES algorithm while the algorithm used by the SIPS encryption means 48 can be an RSA algorithm. The FIPS key designation means 30 may use many ways to establish a key: at random, among a list, on the basis of data characteristics, on the basis of the encryption time, etc. It may select different algorithms from one securing operation to another. The same applies to the SIPS. The established key may be a single key or a series of keys processed in a predetermined manner. The key B identification may identify a correspondent key set and a correspondent key among a key set. FIG. 11 illustrates a suitable data structure for this latter realization. A public key may be established on the basis of unsecured data in the integrated secured data, for instance the generation time. The SIPS 12 may include puzzling means that inserts incoherent information in the communication for the FIPS in order to hinder the understanding of communications between the systems. This incoherent information may or may not be included in the integrated secured data. The puzzling means may also scramble information (change information order), or may input power fluctuation.

A variation is to allow the SIPS 12 to encrypt highly sensitive data, or any sensitive data when the amount of such sensitive data remains under a predetermined volume threshold. The data encrypted with the SIPS 12 is more highly secured. However, it typically requires more processing time to encrypt data with the SIPS 12 than it does with the FIPS 10. Accordingly, a balance between the sought-after security level and processing time must be reached. A common solution is to limit the use of SIPS 12 with its stronger encryption algorithm to the processing of less voluminous data.

It must be noted that the only secret datum communicated from the SIPS 12, therefore in a less secure environment, is the key B identifier (in a secured form). Although someone knowing the public key S may gain knowledge of the key B identifier, it is useless without knowledge of the SIPS stored keys. Accordingly, the invention requires a hacker to monitor the FIPS 10 when the encryption is performed to read the unsecured sensitive data. Otherwise, someone gaining possession of integrated secured data afterwards would have to find the randomly established key A for each secured integrated data.

Furthermore, not even the SIPS owner has any knowledge of the keys. These are securely stored in the SIPS when it is set. Afterwards, no one can gain access to these keys.

5. Messaging

The object of securing sensitive data is to share it with a user (a receiver). Accordingly, the integrated secured data must be communicated to the user in an appropriate manner. The recipient (or receiver) may automatically receive integrated secured data or manually retrieve it through a predetermined process.

5.1 Messaging—Structural Description

For that object, the FIPS 10 comprises at least one communication means 22 for out-system communication, or storage means 26 for storing the secured sensitive data to be later retrieved by the receiver. Each one of these components allows the sender to transmit, or to store, the integrated secured data in order for the selected recipient (receiver) to retrieve the integrated secured data, to convert it in a readable format, and to read the sensitive data. Afterwards, if the recipient (receiver) deems it appropriate, he may transmit the sensitive data to another user, in a secured manner or not.

The FIPS may comprise automatic deletion means to delete the sensitive data automatically once secured. The FIPS may also comprise communication control means closing unnecessary communication means when appropriate. It may also comprise anti-spy means to prevent any monitoring of data by any fraudulently installed spying agent during the securing process.

5.2. Messaging—Process Description

The sender may transmit the integrated secured data in two ways: by storing the integrated secured data locally on a storage means, or by storing the integrated secured data on another system storage means. This second solution may be realized through LAN communication, such as email. However, many other messaging alternatives are available.

6. Decryption Process

According to the communication process, the receiver may have to retrieve the integrated secured data, or may have to gain access automatically to the integrated secured data. Since this step offers many possibilities, none of which are characteristic of the invention, it is not described in details. In consequence, the following description takes for granted that the integrated secured data was ready for decryption when it reached the receiver.

6.1. Decryption Process—Structural Description

The system components required for the decryption process are very similar to the ones used for the securing process. Furthermore, a typical realization of the invention comprises both the encryption and the decryption components into the same system combination.

Figure 12:
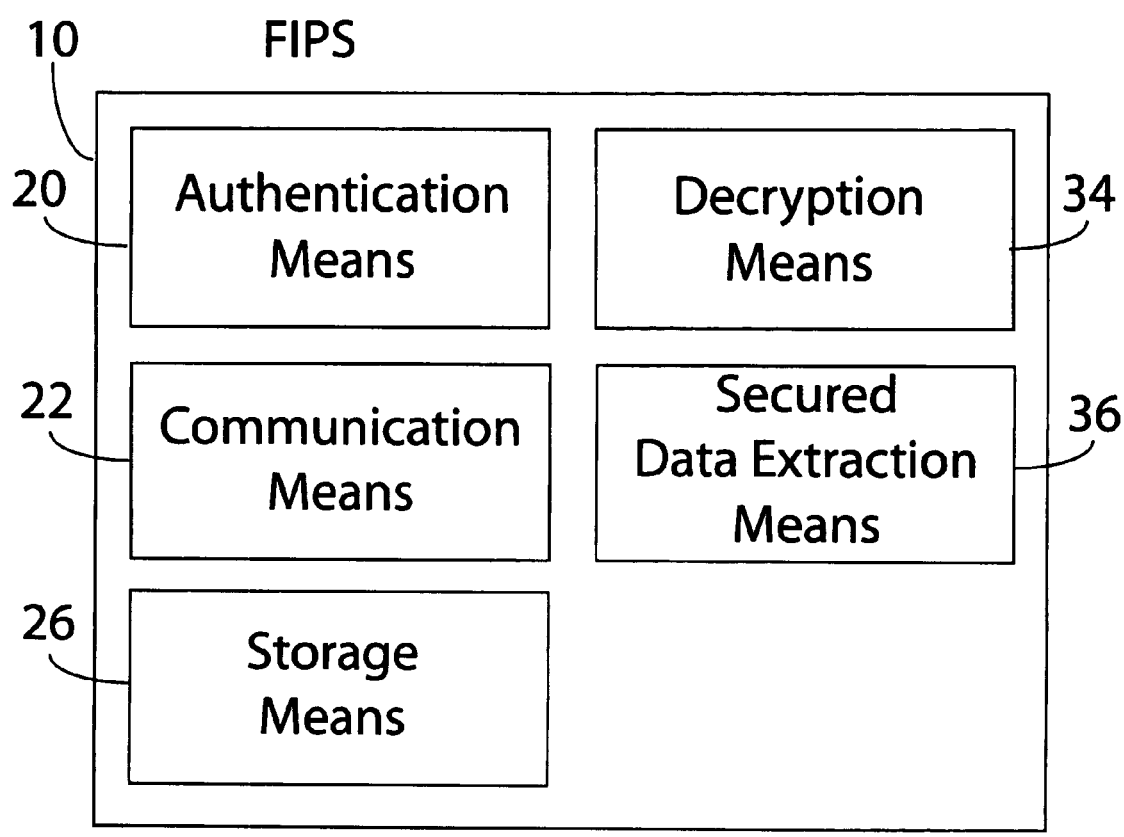
FIG. 12 is a schematic block diagram illustrating FIPS decryption components.
Figure 13:
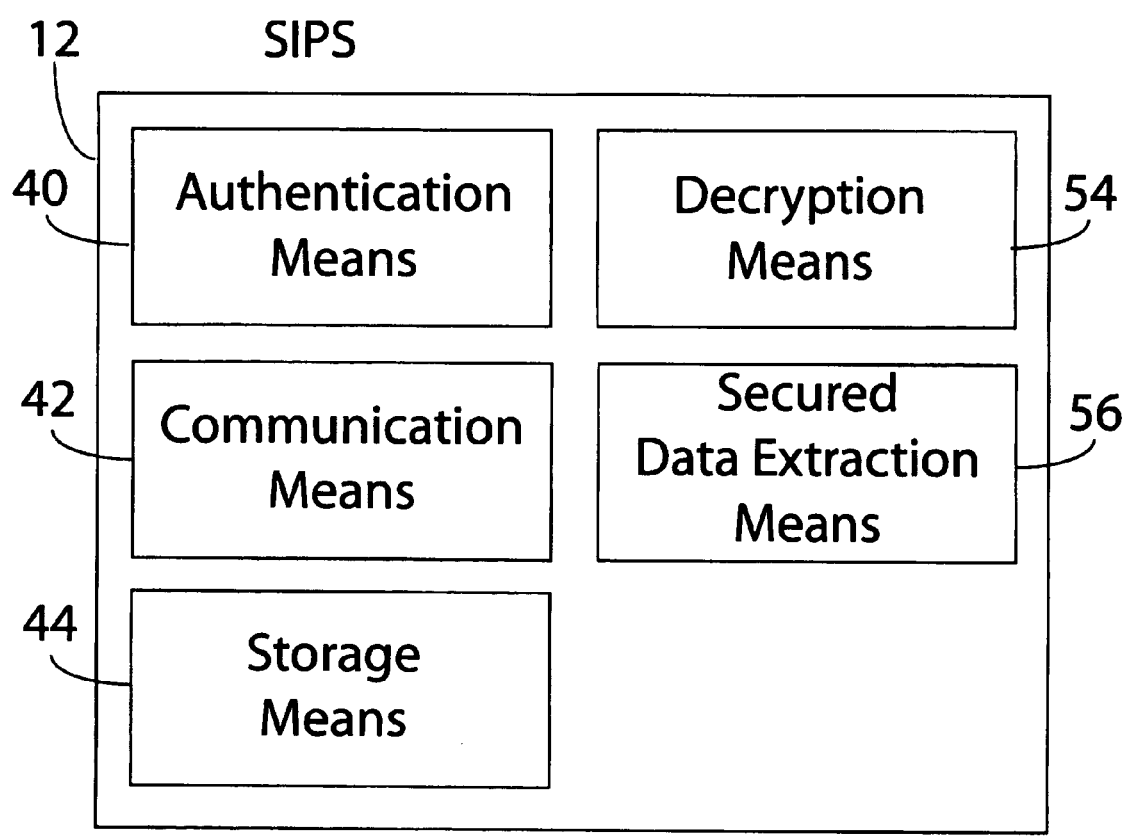
FIG. 13 is a schematic block diagram illustrating SIPS decryption components.

The receiver systems are similar to encryption systems: a First Information Processing System (FIPS) 10—FIG. 12 and a Second Information Processing System (SIPS) 12—FIG. 13; both systems 10 and 12 include similar components as for the encryption process, except the encryption means 28 and 48 being replaced by decryption means 34 and 54 and the secured data integration means 32 and 50 being replaced by secured data extraction means 36 and 56.

The process of decrypting integrated secured data includes retrieving the integrated secured data, authenticating the user, and decrypting the integrated secured data. The data-retrieving step is not described, as stated above.

7. Authentication

The authentication process requires the same system structures as stated in the description of the securing process. The FIPS 10 therefore comprises authentication means 20 and communication means 22. The SIPS 12 comprises authentication means 40, communication means 42, and storage means 44.

The authentication process follows exactly the same steps as the ones listed for the securing process: establishing a communication link; providing identification data; and signaling successful authentication process. When all these steps are completed, the decryption process begins.

8. Decryption

Following the authentication, a securing software window opens on the FIPS display. The user selects a decryption option, discloses the integrated secured data to the software, and commands its decryption to the software. This command initiates the decryption process.

8.1. Decryption—Structural Decryption

To complete the decryption process, the FIPS 10 requires components functionally similar to the ones of the sender's FIPS 10: a storage means 26 in which the integrated secured data is stored, secured data extraction means 36, decryption means 34 and communication means 22. The SIPS 12 requires decryption means 54, storage means 44, secured data extraction means 56, and communication means 42. In the SIPS storage means 44, the data allowing decryption of the integrated secured data must be available; the public key, the correspondent key identifier, and the associated correspondent key used during the encryption process of the sensitive data must be there to efficiently perform the decryption process.

8.2. Decryption—Process Description

Decryption can be divided into a plurality of subsequent steps: extraction of necessary data from the integrated secured data, extraction in the SIPS of the key used to encrypt sensitive data, and decryption of the sensitive data.

8.2.1. Data Extraction from the Integrated Secured Data

Figure 14A:
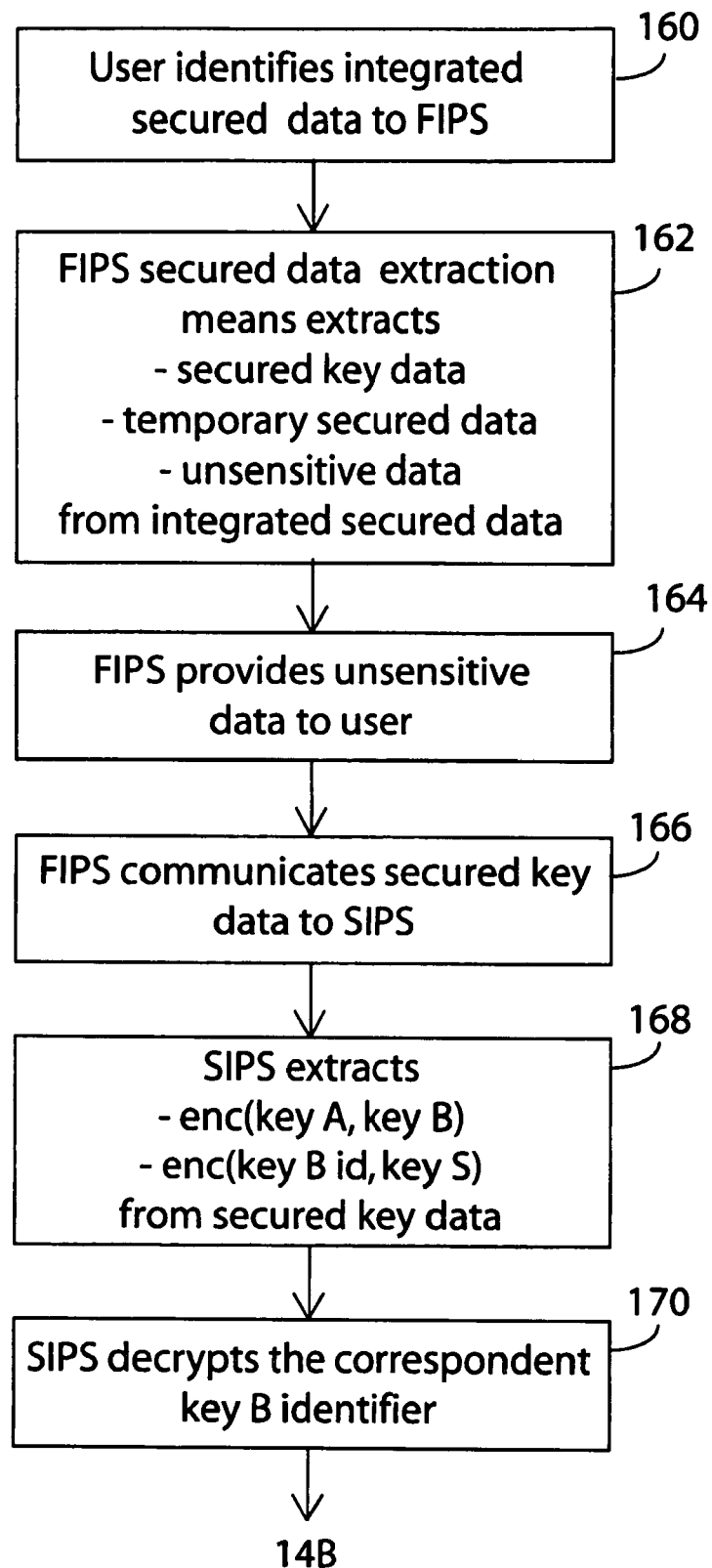
FIGS. 14a and 14b is a flow chart illustrating the decryption process.
Figure 14B:
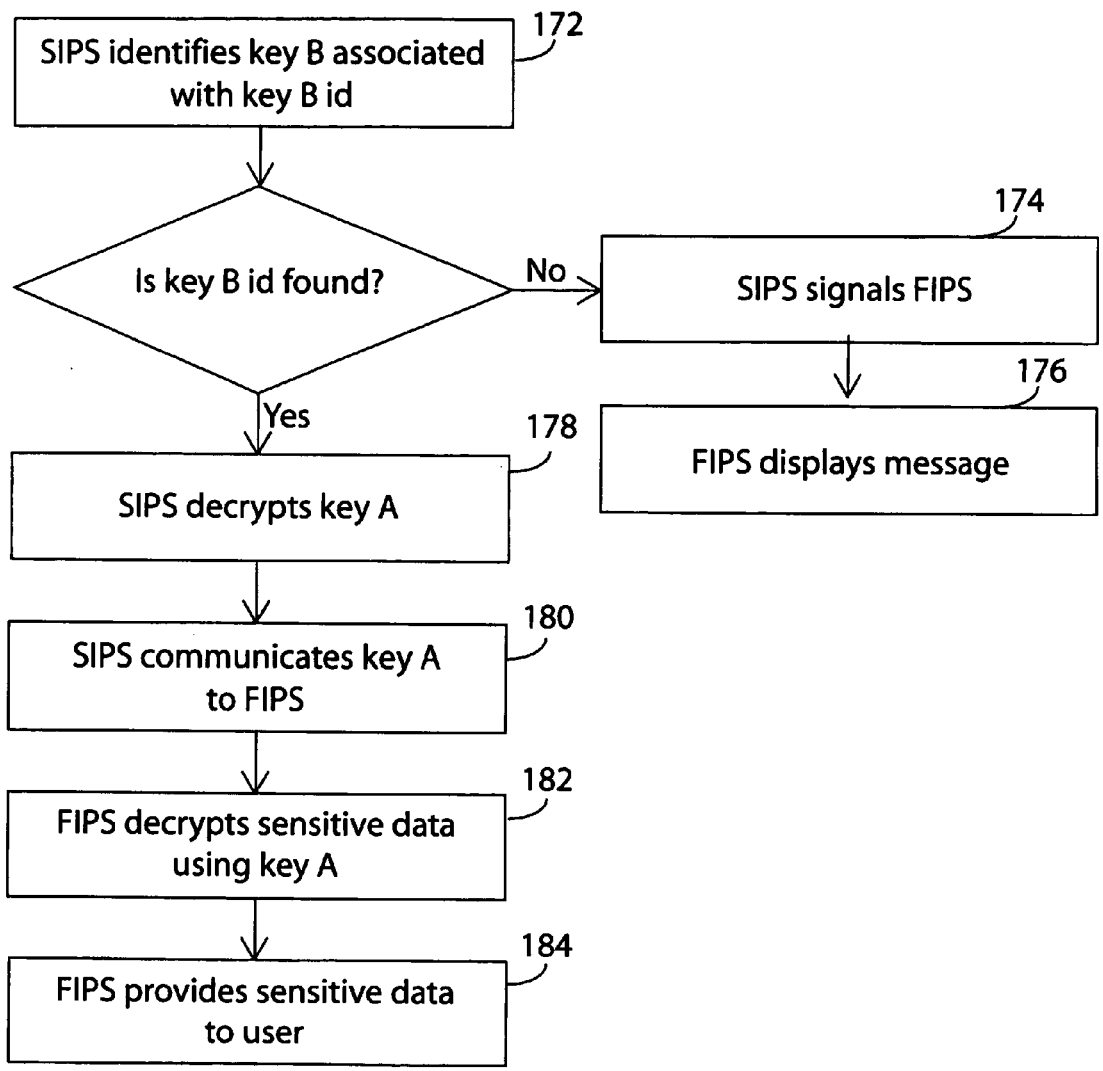

Once the integrated secured data is identified by the decryption program (step 160—FIG. 14), the program stores the integrated secured data into its storage means. Afterwards, the secured data extraction means extracts the diverse types of data integrated during the encryption process (step 162). This data is identified in a predetermined way, for example, on the basis of its position between predetermined strings or at the beginning or at the end of the integrated secured data. The non-sensitive data is displayed on the FIPS screen (step 164). The FIPS communicates the secured key data to the SIPS (step 166).

8.2.2. Key Extraction

When receiving the data, the SIPS stores it into its storage means. Then, the secured data extraction means extracts the encrypted key identifier (step 168). The decryption means uses the known public key S to decrypt the key identifier (step 170). The key identifier is compared to the identifier list in the storage means to identify the associated key (step 172). If no key identifier match is found, the SIPS transmits an error signal to the FIPS (step 174), which displays a message informing the user that the decryption has failed (step 176). If a key identifier match is found, the decryption means uses the identified associated key to decrypt the remaining part of the data (step 178). When decrypted, the result is a decryption key A that is signaled to the FIPS (step 180).

8.2.3. Sensitive Data Decryption

The FIPS decryption means uses the signaled key A to decrypt the extracted secured sensitive data provided by the secured data extraction means (step 182). Accordingly, the decryption means provides unsecured sensitive data to the user (step 184), which can be handled at the user discretion. It includes accessing the sensitive data, storing it, etc. If access to the sensitive data must be restricted for the receiving user, the degree of freedom is controlled through other means, such as the sensitive data format, which is not part of the invention.

9. System Setting

The present invention allows the establishment of secured communication between users in a less expensive and more secure way than by configuring a highly secured communication link between users. However, this process requires setting up secured sending\receiving systems for the communication link (secure SIPSs). In other words, it requires pairing SIPSs to allow them to securely exchange sensitive data.

The system also allows users having compatible SIPSs to autonomously pair themselves to allow operations of communication between them.

Accordingly, the preferred invention realization includes a first SIPS setting process during which keys are stored. During this process, users may be paired or not. It is the initial SIPS setting process.

Afterwards, when required, users may autonomously pair themselves without having to get a new SIPS. It is the dynamic SIPS pairing process.

10. Initial SIPS Setting

The initial SIPS setting is the process during which all SIPS components are set in a suitable means, usually an IC card. Depending on the requirements, some components may already be present in the means (for instance, hard wired) and some of them may be installed during the process (for instance, set by downloading suitable program code in the SIPS). Data stored in the means include keys, key identifiers, authentication data, etc. If pairing is also set, then correspondence data are also included.

10.1 Initial SIPS Setting—Structural Description

Figure 1:
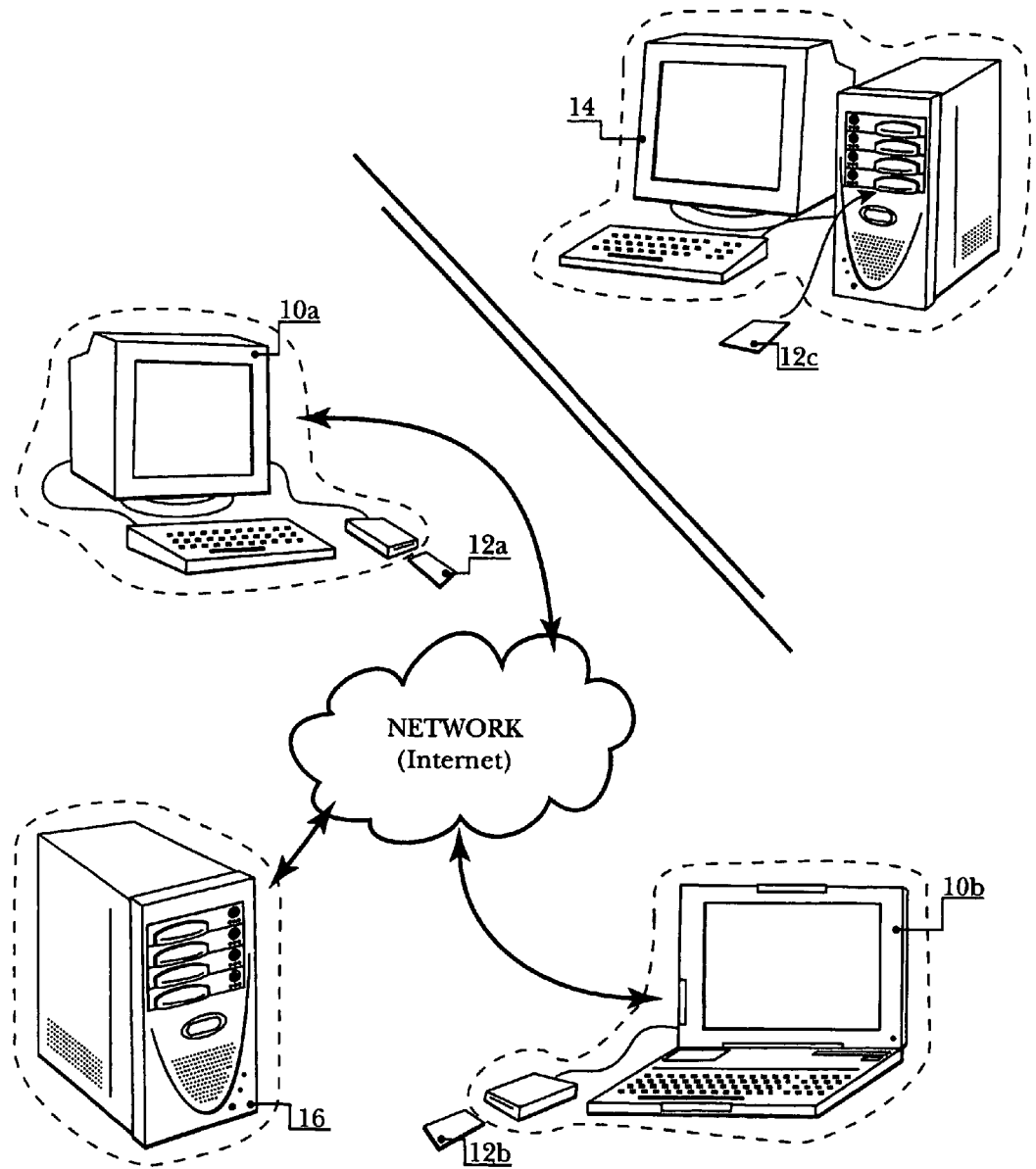
FIG. 1 is a schematic illustration of a realisation of the invention, including First, a Second Information Processing Systems, a networked system including storage means, and a remote setting means.
Figure 15:
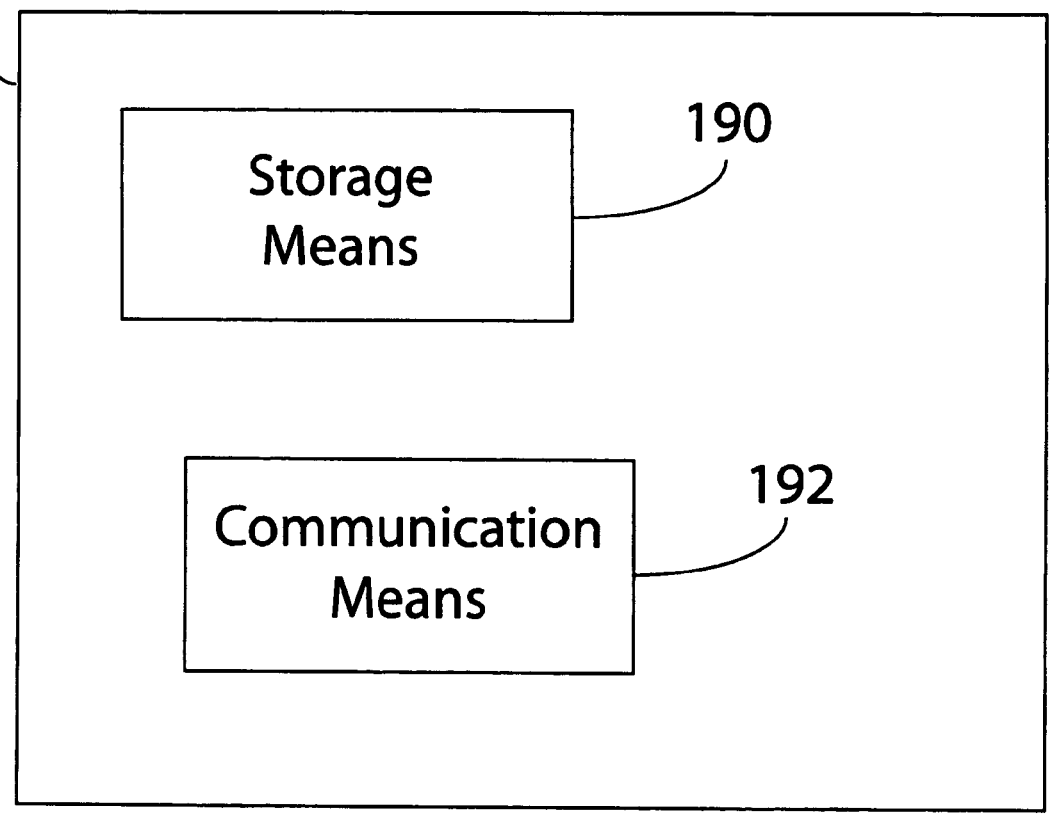
FIG. 15 is a schematic block diagram illustrating the setting means.

To complete the initial SIPS setting, a setting means 14—FIG. 1 is provided and illustrated on FIG. 15. It comprises storage means 190 and communication means 192. The communication means 190 establishes communication with SIPSs. The storage means 190 of the setting means stores all data that must be communicated to a SIPS at its initial setting. In order to prevent any security breach, the setting means has the highest security level possible; it is therefore remote from any unsecured network (and usually not linked to any network).

10.2. Initial SIPS Setting—Process Description

Figure 16:
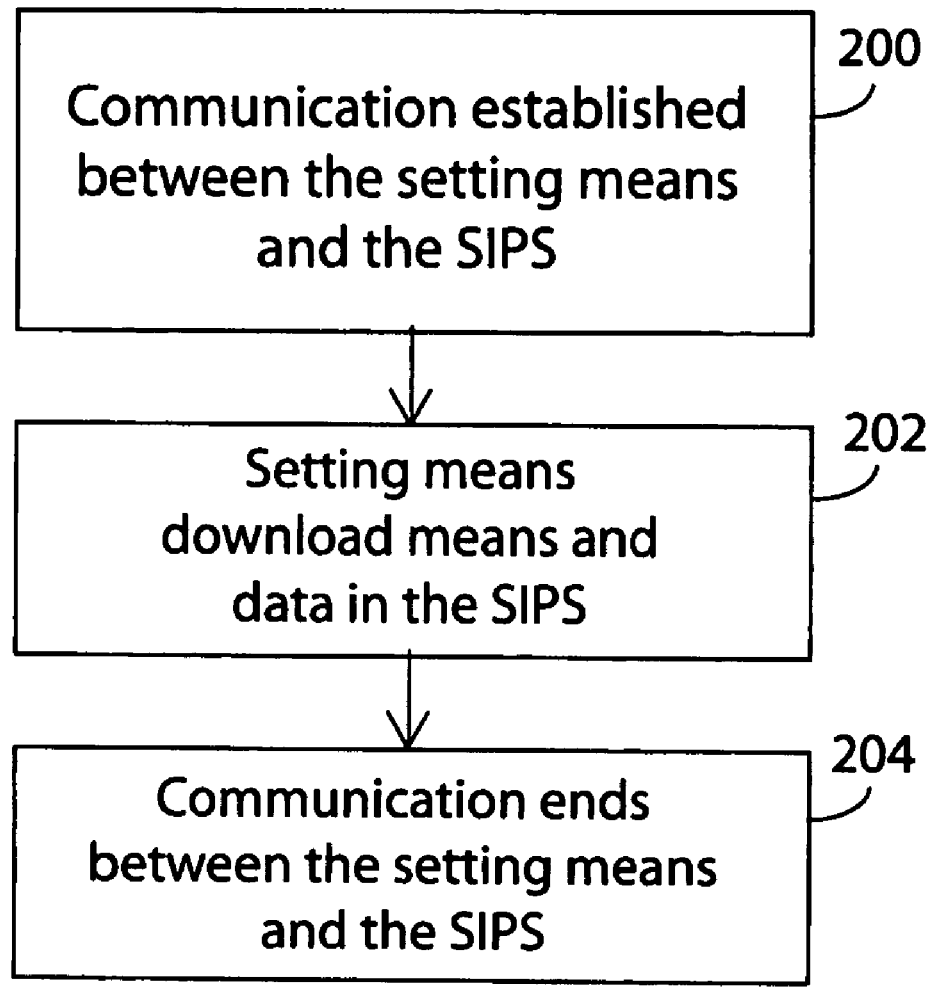
FIG. 16 is a flow chart illustrating the FIPS setting up process.

The initial setting process illustrated on FIG. 16 starts with establishing communication between the setting means and the SIPS (step 200). The means and the SIPS communicate through a particular protocol reserved for the setting process. During the setting process, the setting means communicates to the SIPS the data the latter needs to set the required means that must be installed (step 202). For example, the decryption means may be either hard wired or uploaded by the setting means. The list of the means that may be provided by the setting means comprises the authentication means, the encryption means, the decryption means, the correspondent selection means, and the secured data integration and extraction means. Additionally, the setting means stores, in the SIPS, a set of data (step 202) that comprises SIPS identification (if not already set, then storing it in association with current SIPS data), authentication data, public key, correspondence data (if any are already determined), key identifiers, keys, . . . . When all these data have been transferred in the SIPS, the SIPS is set (step 204). The SIPS is given to a user.

Figure 6:
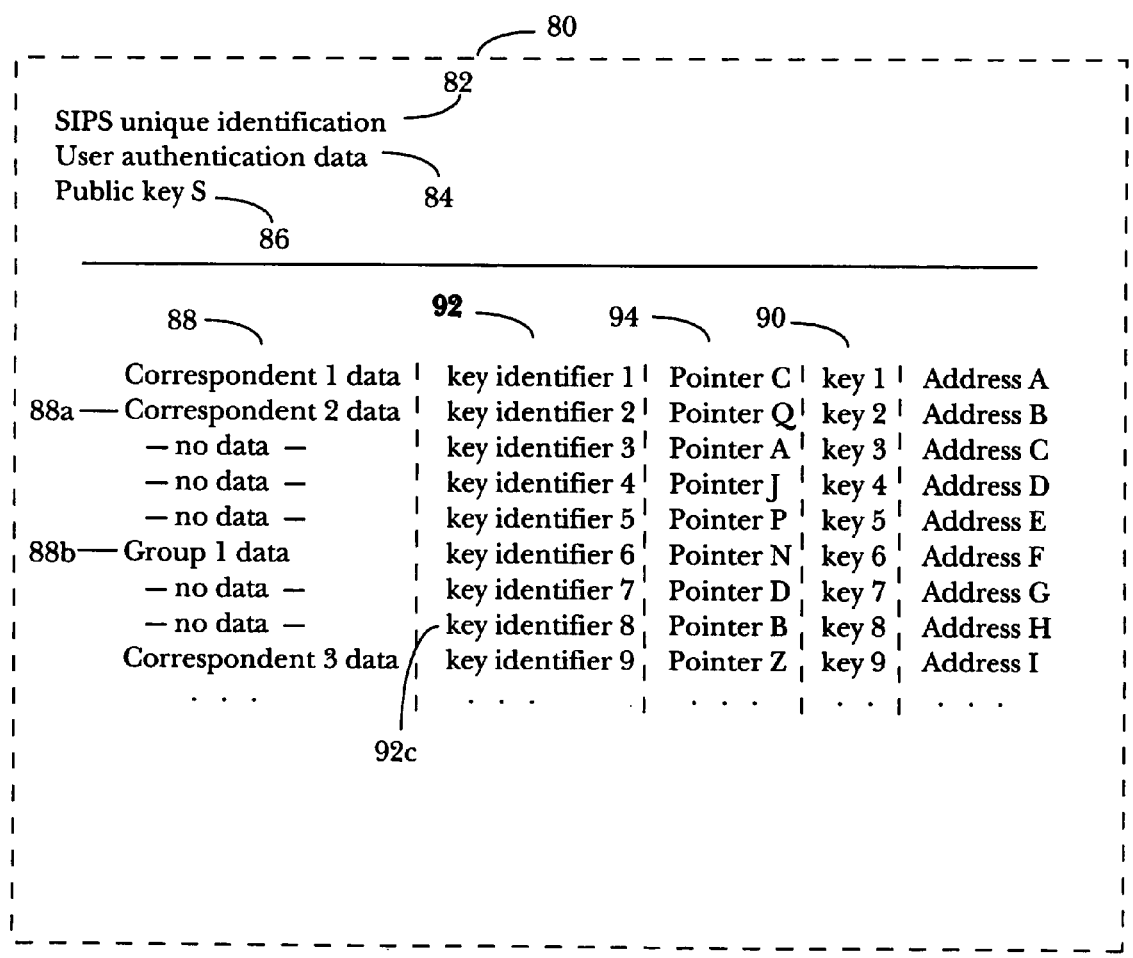
FIG. 6 is a schematic representation of FIPS stored data.

FIG. 6 illustrates, in an understandable format, suitable information stored in the SIPS storage means. As illustrated, it comprises SIPS identification 82, authentication data 84, public key 86, correspondence data 88, key identifiers 92, and keys 90. It further comprises pointers 84, which operatively associate key identifiers 92 with keys 90. Some keys 90c and key identifiers 92*c* are not associated with correspondence data 88; they are available for dynamic pairing. This process will be explained later. Between two SIPSs, there is at least a predetermined portion of keys 90 and key identifiers 92 that are common. Nevertheless, it does not mean that a particular key identifier 92 is or will be associated with the same key 90 on two SIPSs; it only allows efficient pairing. In the example, the keys 90*a-b* and key identifiers 92*a-b* of the A and B categories are paired while the C category keys 90*c* and key identifiers 92*c* are not. It bears repeating that keys 90 and key identifiers 92 are only known by the storing SIPS and the setting means.

11. Dynamic SIPS Pairing

The need of a dynamic SIPS pairing occurs when two or more SIPS owners want to establish a secure communication, but they have not been paired during the initial SIPS setting process or previously paired dynamically. When two SIPS owners want to pair their SIPSs, the process is accomplished through a single correspondent addition. If more than two SIPS owners are involved, a group pairing process can be initiated.

11.1. Dynamic SIPSs Pairing—Single Correspondent Pairing

Figure 17:
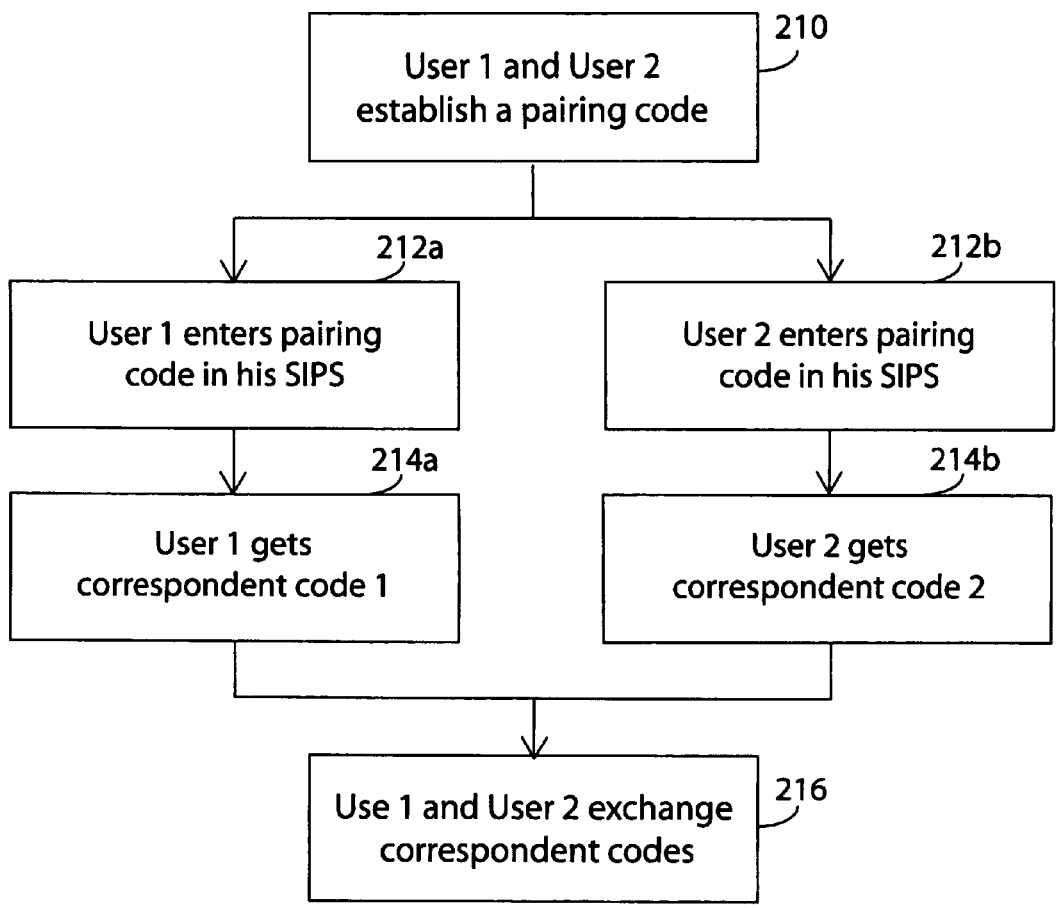
FIG. 17 is a flow chart illustrating users' codes exchange.

When two users want to establish a pairing between their systems, as illustrated on FIG. 17, the process starts with the two users commonly establishing a pairing code (step 210). Each user, through a FIPS pairing program, enters the pairing code into his SIPS (step 212), which returns a correspondence code (step 214). Each user gets a different correspondence code, which must be transmitted to the other user (step 216). The above process represents the only human interaction of the whole process whereby the correspondent identification is ensured.

Figure 18:
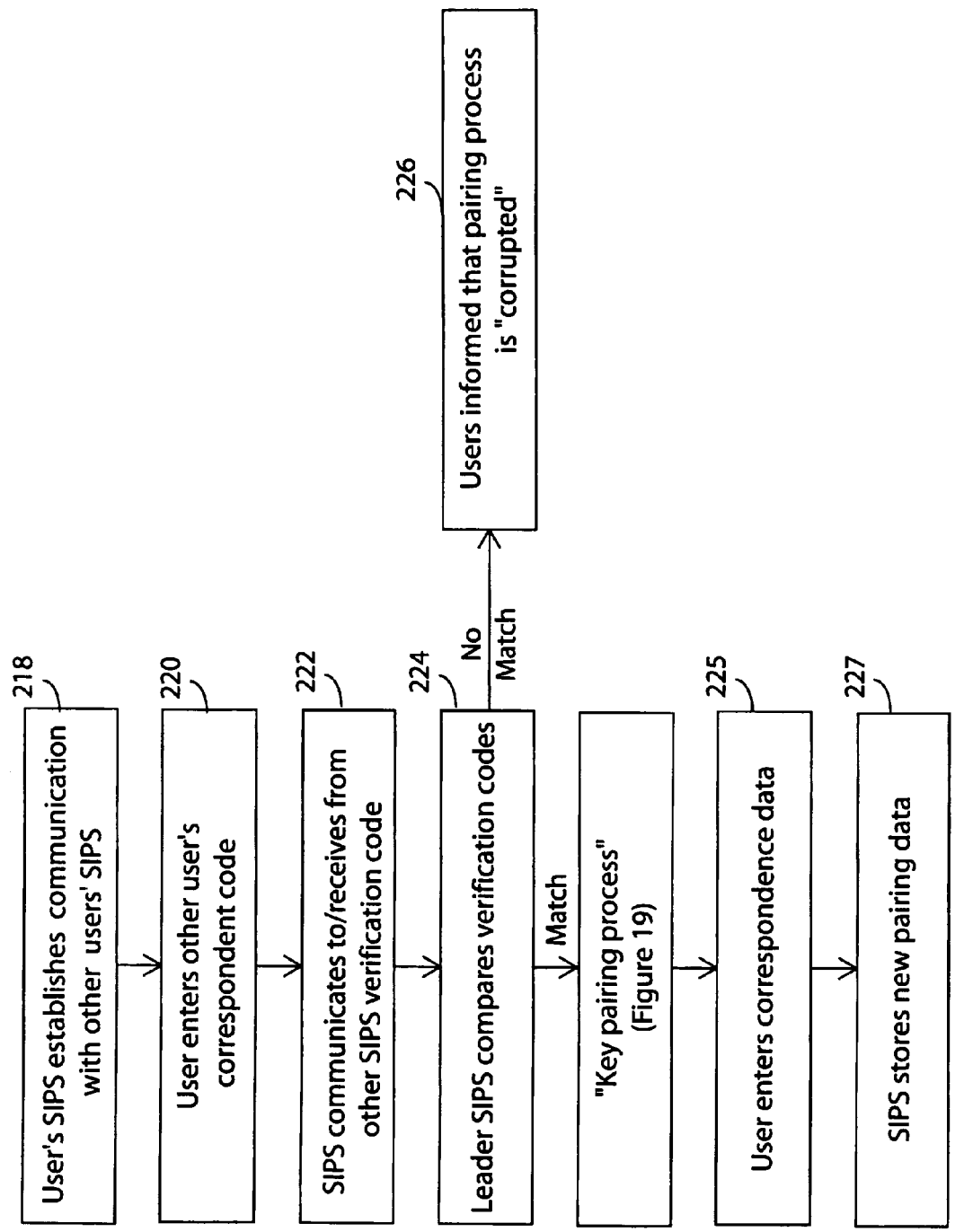
FIG. 18 is a flow chart illustrating a correspondent pairing process.
Figure 19:
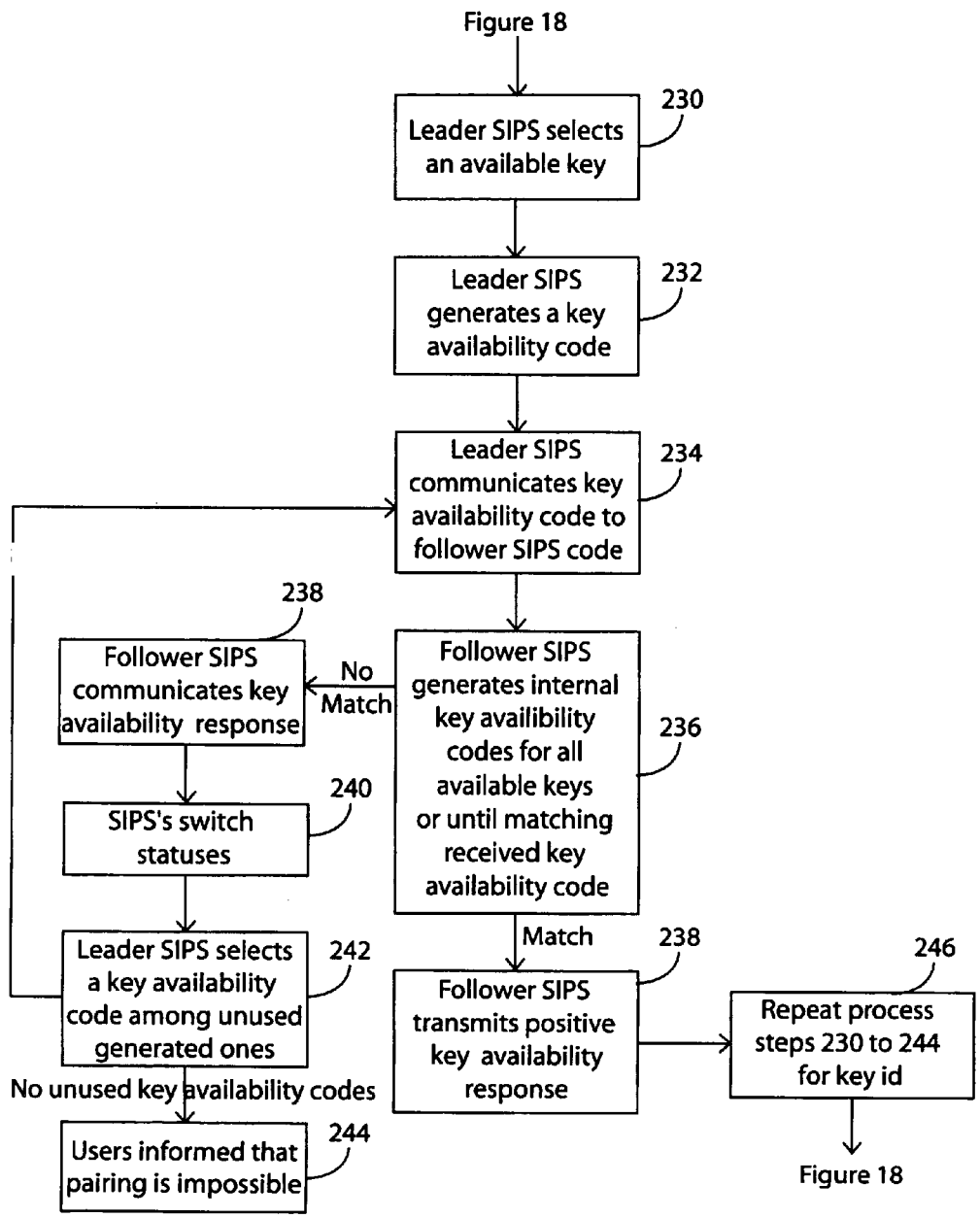
FIG. 19 is a flow chart illustrating a the key pairing process of the correspondent pairing process of FIG. 18.
Figure 20A:
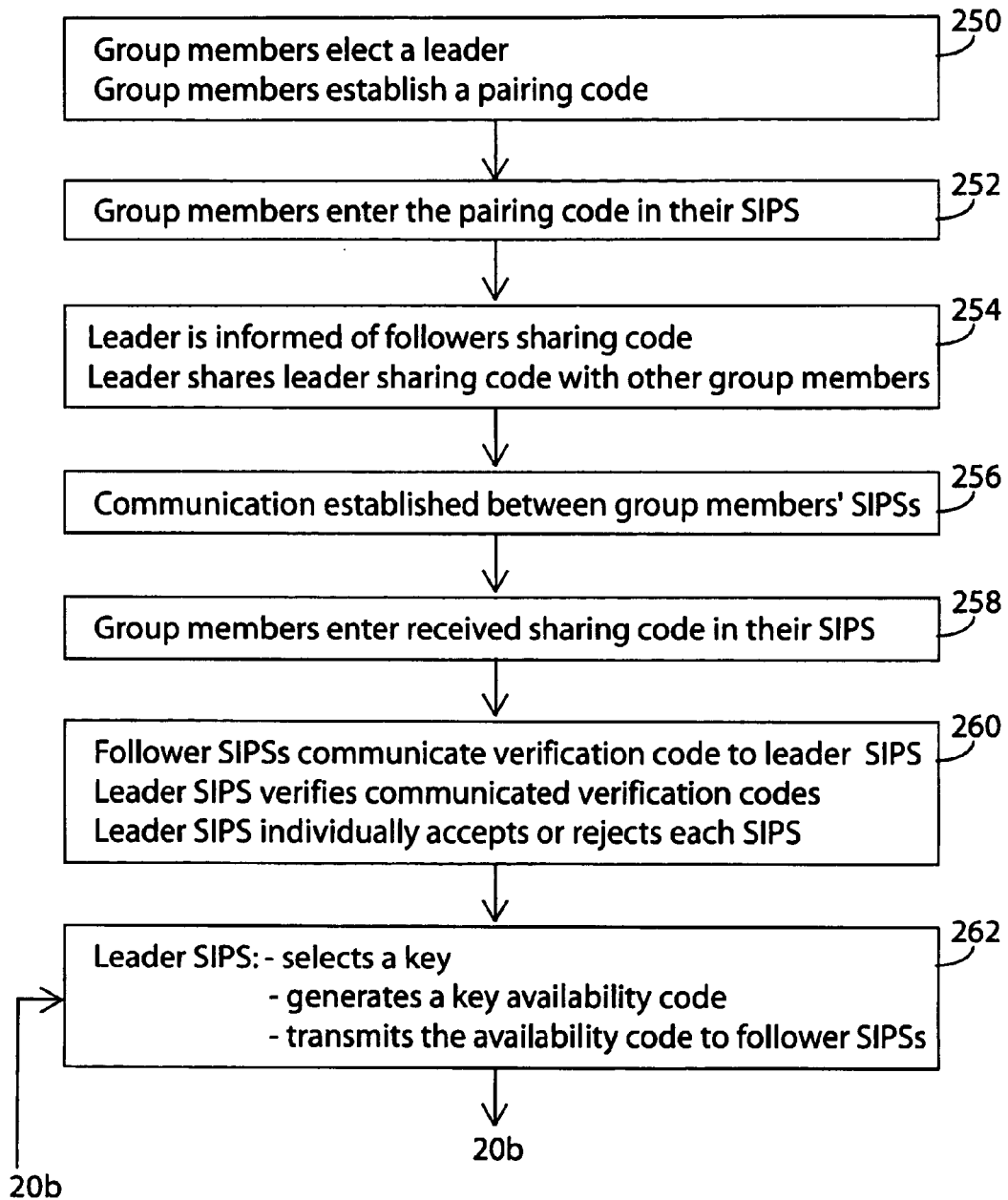
FIGS. 20a and 20b is a flow chart illustrating a group pairing process.
Figure 20B:
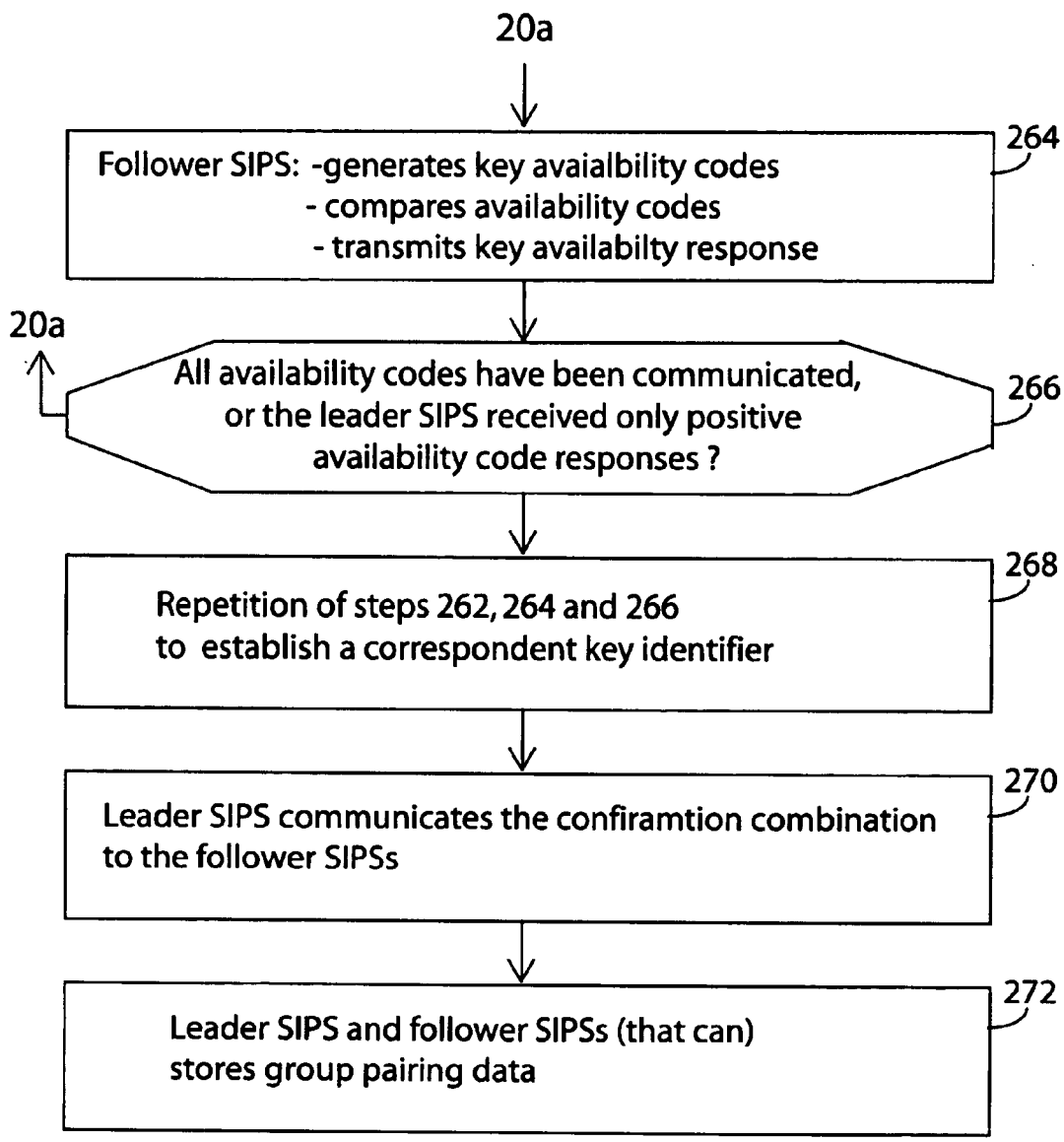
Figure 21:
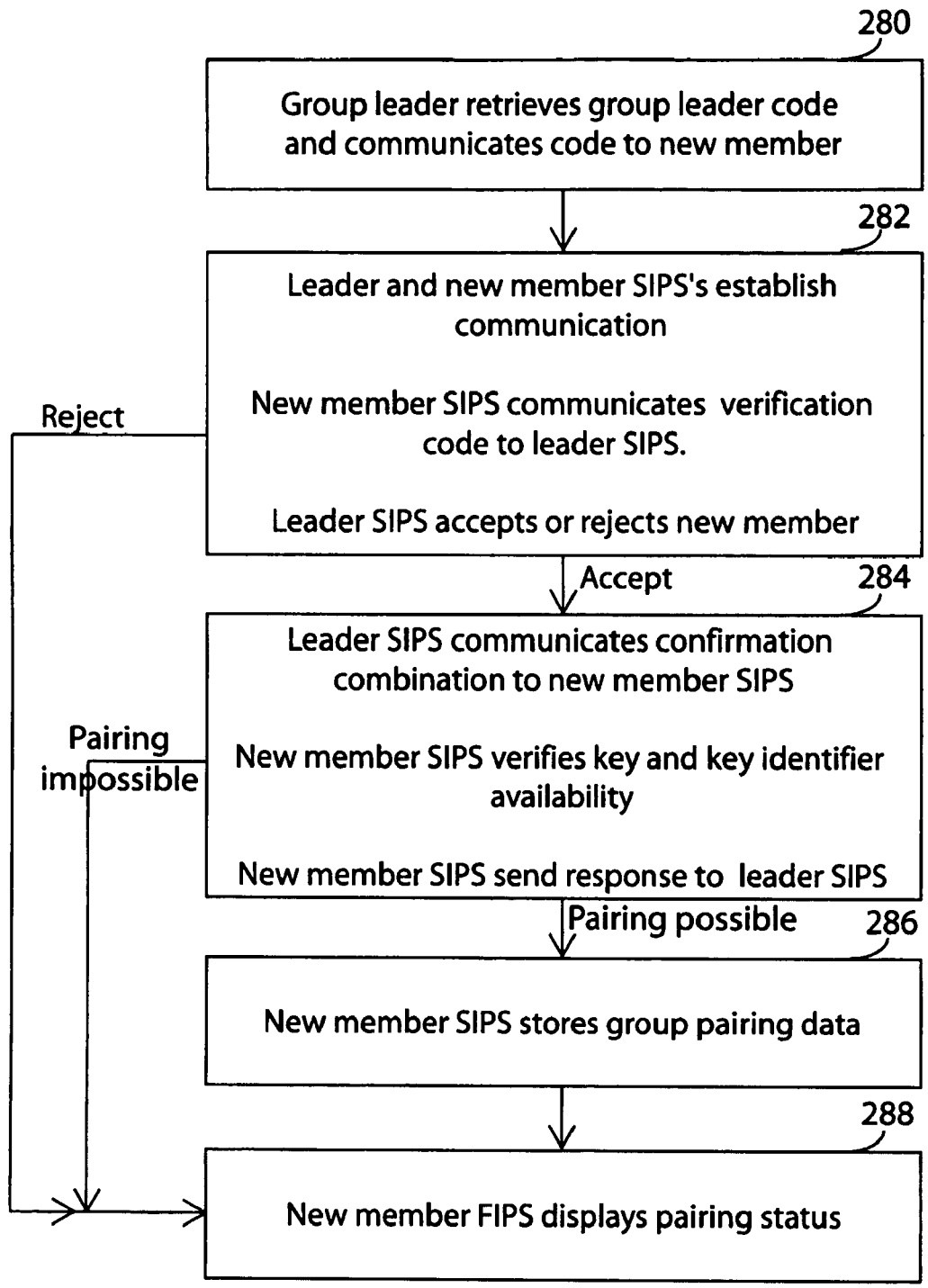
FIG. 21 is a flow chart illustrating a new group member joining an existing group through a pairing process.

Afterwards, as illustrated on FIG. 18, the users must establish communication between the SIPSs through their FIPS pairing program (step 218). The authentication step is required as for any SIPS use. Once the authentication successfully completed and the communication established between the SIPSs, a user enters the other user's transmitted correspondence code into the program (step 220). Each SIPS generates a verification code based on the entered correspondence code. On the basis of the codes, a SIPS is established as the leader SIPS while the other is the follower SIPS. The leader SIPS receives the verification code from the follower SIPS (step 222) and also compares the verification codes (step 224). If the verification codes match, pairing is allowed, otherwise, pairing is denied and its failure is signaled to the users' FIPS (step 226).

The leader SIPS initiates the pairing. First, the leader-SIPS pairing means verifies in its storage means available keys, selects one (step 230), and generates at first a key availability code (step 232) to be transmitted to the follower SIPS (step 234). The key availability code identifies a selected key in a ciphered way based on a ciphering code. Only the means knowing the ciphering code (the leader and follower SIPSs), the deciphering process, and the list of stored keys can identify the selected key. Since the ciphering code is calculated in the same way as the verification signal (on the basis of the correspondence codes), the ciphering code is secret. A suitable means may find the ciphering code only if it knows both the ciphering algorithm and the two correspondence codes.

Upon receiving the key availability code, the follower SIPS verifies the key correspondence through an enciphering process of all stored keys and through a comparison of the ciphering results with the transmitted key availability code (step 236). Afterwards, the follower SIPS transmits a key availability response to the first SIPS (step 238).

If the key verification process fails, the follower SIPS repeats the same process; therefore, the SIPSs switch their status (step 240). Accordingly, the new leader SIPS identifies a new key availability code among the generated ones (step 242) and sends it back to the new follower SIPS (step 234). This process continues until an ending status is reached, whether an available key on both SIPS is identified or no common keys are available.

Afterwards, the same process repeats itself for the key identifier (steps illustrated as the global step 246).

If no correct key or key identifier is found, the process is aborted. Each user is informed that the pairing process has failed (step 244). At least one of the users can get a new SIPS with greater key and key identifier availability.

The user is invited to enter the correspondent data (step 335—FIG. 18) either when the two SIPSs have found a correct key and key-identifier combination or when the correspondence code is entered. When all these steps are completed, each SIPS updates the information in the storage means on the basis of the newly established pairing (step 227).

11.2. Dynamic SIPS Pairing—New Group Pairing

When multiple users want to securely communicate with each other, they have the option of individually pairing with each other, or to create a group of correspondents. Members of a group have the freedom of getting access to all messages secured on the basis of the SIPS group information, regardless of the sender's identity. A group may be created during the initial setting of the SIPSs. It may also be dynamically created subsequently. Group membership can also be acquired, provided the group leader accepts the new member.

To complete a group pairing, group members elect a group leader, and the other users become group followers. The group members establish a pairing code (step 250) as in the individual pairing process. Each user, through his FIPS, initiates the pairing process. They authenticate themselves. They identify the pairing process as a group pairing and their status, either as leader or as follower. They provide group identification and enter the pairing code in their SIPS. In response, each member receives either the leader's or a follower's sharing code. All followers get the same follower sharing code (step 252).

The leader transmits the leader's sharing code to all followers and receives the follower sharing code from at least one follower in the group (step 254).

Afterwards, the group members establish communication between their SIPSs (step 256), the higher the number of linked group members communicating, the better the group pairing result. Each follower enters the received sharing code (step 258). Afterwards, the leader checks each follower (step 260). If a follower fails the verification, the SIPS is automatically rejected from the remaining part of the pairing process. When all communicating SIPSs have been accepted or rejected, the leader SIPS sends a key availability code to all accepted followers (step 262), with each of them accepting or rejecting the proposed key (step 264). The process continues until all followers in communication have accepted the proposed key or until an ending state is reached. The same process repeats itself for the key identifier availability code. When the key and key-identifier ending state is reached, the leader SIPS sends a confirmation combination to all of the follower SIPSs in communication. The confirmation combination is determined on the basis of the proposed combination responses. The SIPSs with an available key and key identifier, which correspond to the confirmation combination, update the information in their storage means. The other SIPSs inform their users that it is impossible to establish group membership without a new SIPS. Accordingly, the group is then created on the leader SIPS and at least one of the follower SIPS.

11.3. Dynamic SIPS Pairing—Existing Group Pairing

When a new member wants to join a group, either as a new member or for any other reason such as the SIPS having no available key and key identifier corresponding to the confirmation combination, the new member SIPS establishes communication with the group leader.

Accordingly, the new group member contacts the group leader, who provides the new group member with the leader group correspondence code. Since the leader SIPS stores the leader correspondence code and the verification code, the group leader may retrieve the leader correspondence code of the group through its FIPS.

Afterwards, the process is highly similar to the single-correspondent pairing process. The leader and the new member activate their First and Second IPSs. They initiate the pairing process, which includes identifying the pairing type, entering the leader correspondence code and group information for the new member. They establish communication between the SIPSs. The new member SIPS communicates the verification code to the leader SIPS, with the leader SIPS accepting or rejecting the new member SIPS. If the new member is accepted, the leader SIPS communicates the confirmation code used when the group was initially established to the new member SIPS, this one confirming reception and availability of the leader SIPS.

If the combination sent is available in the SIPS of the new member, the SIPS is accordingly updated. Otherwise, the new member is required to get a new SIPS to become member of the group.

11.4. General Comments on Pairing

Communication of ciphered results rather than ciphered proposed keys and key identifiers is one proposed solution for that process. It is advantageous by preventing the communication of the keys, which should stay secret and therefore never be communicated. However, others may choose other solutions for that problem. One of the possible alternatives for that process is to communicate key and key identifier in combination.

12. Structural Overview

Since a single SIPS is commonly used for the process comprising the encryption, the decryption and the pairing, the following provides a structural summary of a typical SIPS suitable for all these steps. Accordingly, a structural overview of a FIPS is also provided in the same manner.

12.1. Structural Overview—First Information Processing System (FIPS)

Figure 22:
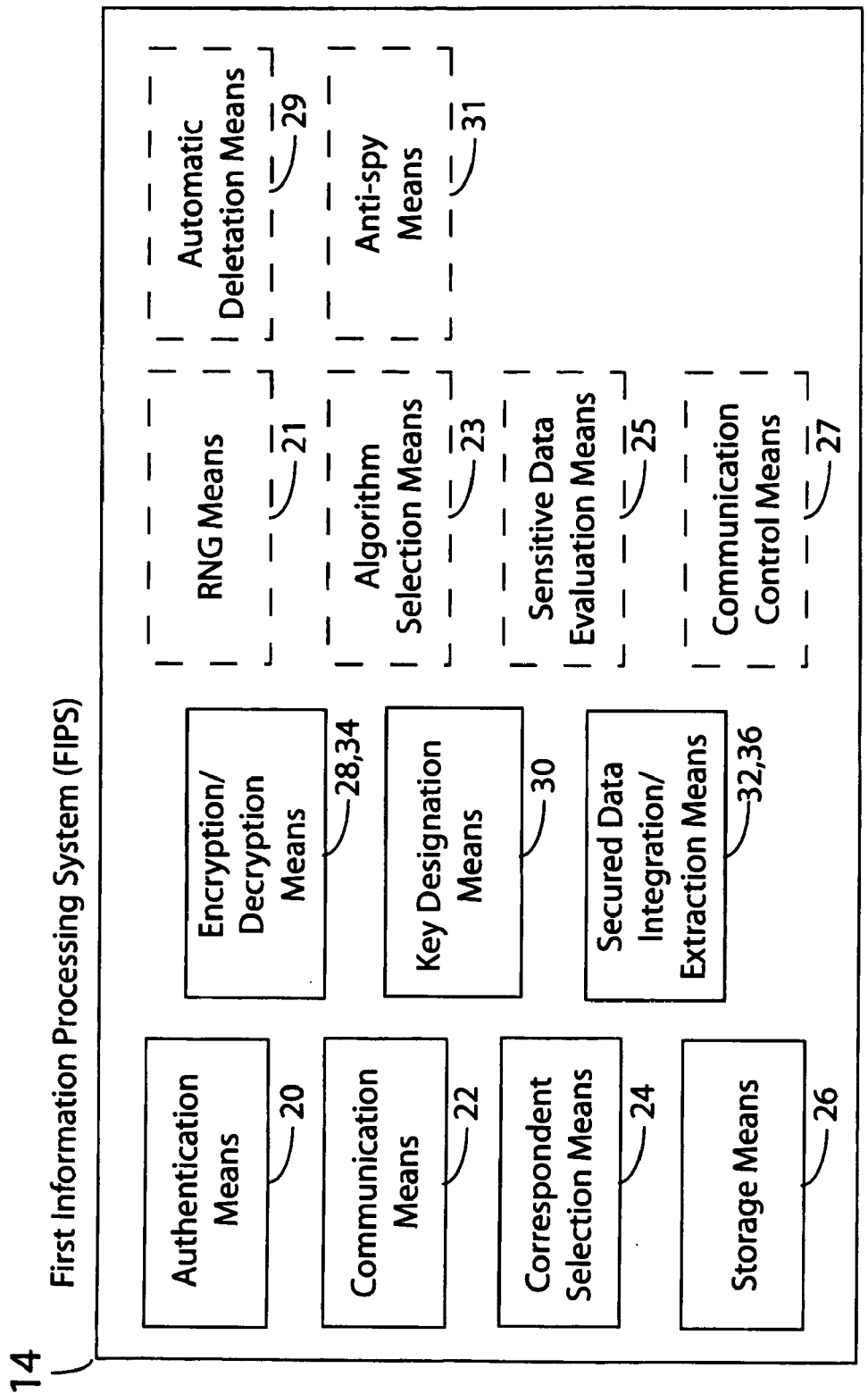
FIG. 22 is a schematic block diagram summarizing a FIPS suitable for encryption, decryption and correspondent pairing.

Accordingly, the FIG. 22 illustrates a FIPS capable of the three processes. The FIPS comprises communication means, authentication means, correspondent selection means, storage means, key designation means, encryption/decryption means (since they are usually configured into a single meaningful structure), and secured data integration and extraction means (also usually combined). The FIPS may also include, when deemed appropriate, random number generation means providing necessary data for the key determination means to randomly determine keys. The FIPS may include algorithm selection means to determine algorithm each time an encryption has to be done. A sensitive-data evaluation means may also be comprised in order to secure the SIPS sensitive data with the FIPS when the data level of sensitivity is very high, or when the amount of sensitive data is under a predetermined threshold. Communication control means may also be comprised to prevent espionage through a communication port when securing data. The FIPS may comprise automatic deletion means to protect unsecured data to be accessed after the securing process. Finally, anti-spy means may also be included in order to prevent a spy agent hidden in the FIPS to gain knowledge of the securing process.

12.2. Structural Overview—Second Information Processing System (SIPS)

Figure 23:
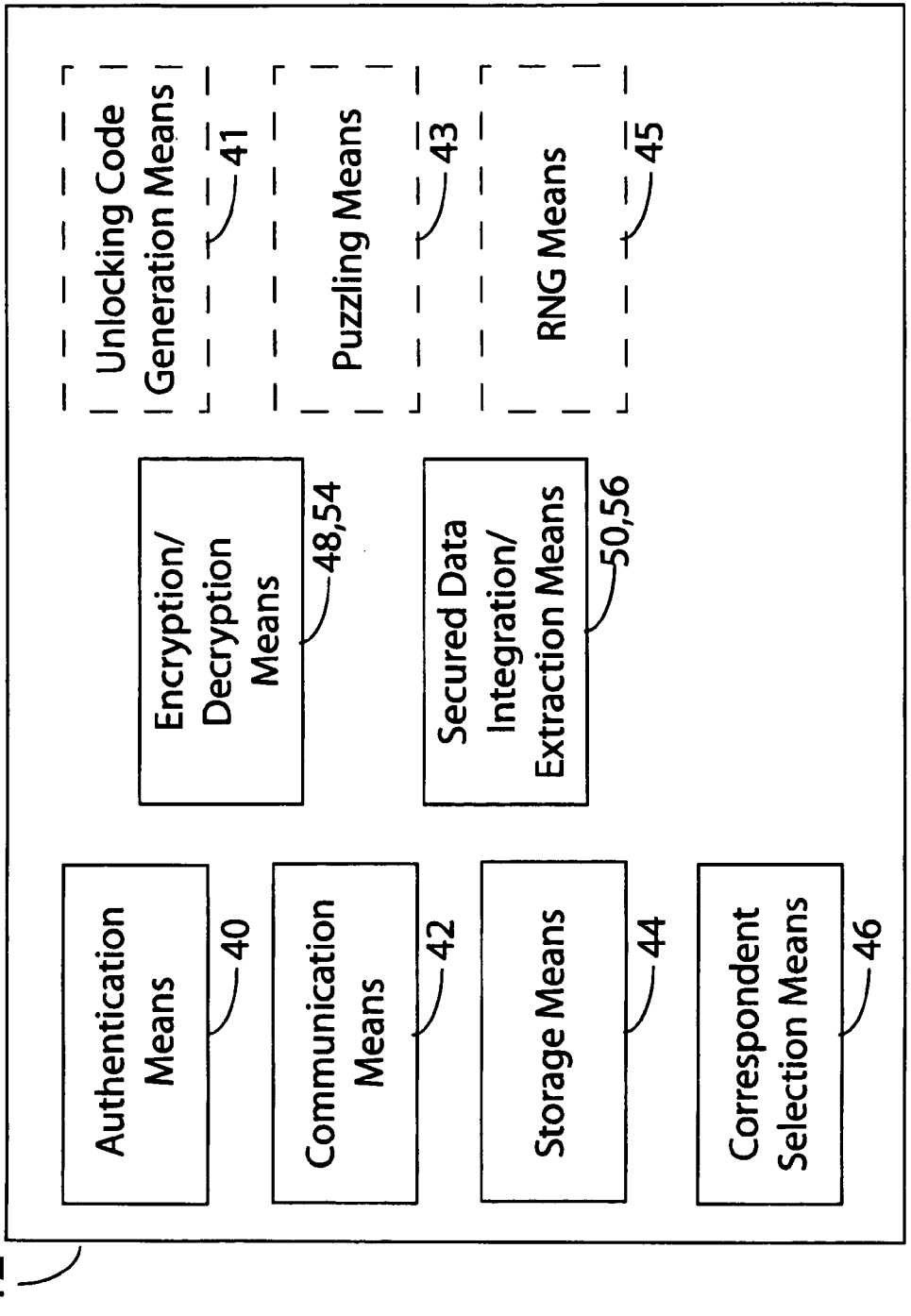
FIG. 23 is a schematic block diagram summarizing a SIPS suitable for encryption, decryption and correspondent pairing.

A summarized illustration of the SIPS is provided through the FIG. 23. The SIPS includes communication means, authentication means, storage means, encryption/decryption means (usually combined), and secured data integration and extraction means (also usually combined). An unlocking code generation means may be included to generate an unlocking code upon reception of too many erroneous-identification data signals. A puzzling means may also be comprised in the SIPS. A random number generation means and/or other determination means may also be comprised in the SIPS to complete the determination associated with the encryption.

Accordingly, while the invention has been described in connection with the specific embodiments thereof, it will be understood that the invention is capable of further modifications. It is the intent to cover applications comprising any variations, uses, or adaptations of the invention following, in general, the principles of the invention. It is also the intent to cover applications including departures from the present disclosure which may come from common knowledge or customary practice within the art to which the invention pertains. These applications will find their essential features herein set forth in the scope of the appended claims.

The invention claimed is:

1. An information processing method comprising:
    generating a first key in a First Information Processing System (FIPS);
    encrypting sensitive data using the generated first key, thereby generating temporary secured sensitive data;
    selecting a correspondent to whom the sensitive data is destined;
    transmitting the first key and correspondent selection data from the FIPS to a Second Information Process System (SIPS) which is arranged separate from the FIPS;
    identifying among SIPS stored key identifiers and keys a correspondent key identifier and a correspondent key based on received correspondent selection data from the FIPS;
    encrypting the first key using the identified correspondent key, thereby generating a secured first key in said SIPS;
    encrypting the identified correspondent key identifier using a SIPS stored public key, thereby generating a secured key identifier in said SIPS;
    transmitting the secured first key and the secured key identifier from the SIPS to the FIPS; and
    integrating into integrated secured sensitive data the temporarily secured data, the secured first key, and the key identifier,
wherein said correspondent key is established with a system operated by the correspondent prior to performing said information processing method without having communicated said identified correspondent key outside said SIPS.

2. The method of claim 1, further comprising authenticating a user and granting SIPS use to the user.

3. The method of claim 1, further comprising at least one of:
    storing integrated secured data on accessible holding means; and communicating integrated secured data to a correspondent FIPS.

4. The method of claim 1, further comprising erasing the first key, the temporarily secured sensitive data, and the SIPS communicated secured key and secured key identifier from the FIPS.

5. The method of claim 1, further comprising puzzling communication between the SIPS and the FIPS by at least one of:
creating unnecessary signals between valuable signals transmitted to the FIPS; and
modifying SIPS generated signals and data transmitted to the FIPS in order to render more difficult the reading of said signals and data.

6. An information processing method comprising:
extracting from integrated secured sensitive data a secured first key and a secured key identifier on a First Information Processing System (FIPS);
transmitting the secured first key and the secured key identifier from the FIPS to a Second Information Processing System (SIPS) separate from the FIPS;
decrypting the key identifier using a SIPS stored public key on the SIPS, thereby extracting a correspondent key identifier;
identifying a correspondent key associated to the identified correspondent key identifier among SIPS stored keys and key identifiers on the SIPS;
decrypting the secured first key using the identified correspondent key on the SIPS, thereby extracting a first key;
transmitting the first key from the SIPS to the FIPS; and
decrypting the sensitive data using the first key on the FIPS, thereby extracting sensitive data
wherein said correspondent key is established with a system which has generated said integrated secured sensitive data prior to performing said information processing method without having communicated said identified correspondent key outside said SIPS.

7. The method of claim 6, further comprising authenticating a user and granting SIPS use to the user.

8. The method of claim 6, further comprising storing extracted sensitive data on FIPS storing means.

9. The method of claim 6, further comprising erasing FIPS extracted data from the FIPS.

10. A method of securely transmitting sensitive data between a sender and a receiver, the method comprising:
generating a first encryption key on a sender First Information Processing System (FISP), the sender FIPS being under control of the sender and said first encryption key being unknown to a receiver FIPS being under control of the receiver;
encrypting on the sender FIPS said sensitive data using said first encryption key, therefore generating encrypted sensitive data;
providing, separate from the sender FIPS and the receiver FIPS, Second Information Processing Systems (SIPSs), a sender SIPS in secure local communication with the sender FIPS, and a receiver SIPS in secure local communication with the sender FIPS;
the sender FIPS transmitting to the sender SIPS said first encryption key and information relative to identity of the receiver;
the sender SIPS selecting one of a plurality of second encryption keys, said selected second encryption key corresponding to the information transmitted by the sender FIPS regarding the identity of the receiver, and a unique second key identifier corresponding to said selected encryption second key, wherein said selected second key identifier and said selected second encryption key are known by the receiver SIPS while unknown by the receiver FIPS;
the sender SIPS encrypting the first encryption key using the selected second encryption key therefore generating an encrypted first key;
the sender SIPS encrypting said second key identifier using a third encryption key known by the receiver SIPS while unknown by the receiver FIPS, therefore generating an encrypted second key identifier;
the sender SIPS communicating to the sender FIPS said encrypted first key and said encrypted second key identifier;
the sender FIPS combining said encrypted sensitive data, said encrypted first key, and said encrypted second key identifier into a message;
the sender FIPS transmitting said message to the receiver FIPS over a generally unsecured transmission link;
the receiver FIPS extracting from said message said encrypted second key identifier and said encrypted first key;
the receiver FIPS communicating said encrypted second key identifier and said encrypted first key to the receiver SIPS;
the receiver SIPS decrypting said encrypted second key identifier using the third encryption key;
the receiver SIPS retrieving said second encryption key using said second key identifier;
the receiver SIPS decrypting said encrypted first encryption key using said second encryption key;
the receiver SIPS communicating said first encryption key to the receiver FIPS; and
the receiver FIPS decrypting said sensitive data using said decrypted first encryption key therefore generating decrypted sensitive data in a usable format for the receiver,
wherein the sender and the receiver are adapted to initiate a pairing process over said generally unsecured transmission link during which pairing process the sender SIPS and the receiver SIPS exchange signals to establish the use of a common second encryption key without communicating said second encryption key over said generally unsecured transmission link.

* * * * *